United States Patent
Smit

(10) Patent No.: US 10,311,073 B2
(45) Date of Patent: *Jun. 4, 2019

(54) SYSTEM AND METHOD FOR ASYNCHRONOUS RETRIEVAL OF INFORMATION FROM A SERVER TO A CLIENT BASED ON INCREMENTAL USER INPUT

(71) Applicant: MasterObjects, Inc., Zeist (NL)

(72) Inventor: Mark Hans Smit, Vetlanda (SE)

(73) Assignee: MasterObjects, Inc. (NL)

( * ) Notice: Subject to any disclaimer, the term of this patent is extended or adjusted under 35 U.S.C. 154(b) by 247 days.

This patent is subject to a terminal disclaimer.

(21) Appl. No.: 15/436,148

(22) Filed: Feb. 17, 2017

(65) Prior Publication Data

US 2017/0228443 A1    Aug. 10, 2017

Related U.S. Application Data

(63) Continuation of application No. 12/176,984, filed on Jul. 21, 2008, now abandoned, which is a continuation-in-part of application No. 11/257,912, filed on Oct. 25, 2005, now Pat. No. 7,752,326, which is a continuation-in-part of application No. 09/933,493, filed on Aug. 20, 2001, now Pat. No. 8,112,529.

(60) Provisional application No. 60/951,850, filed on Jul. 25, 2007.

(51) Int. Cl.
| | | |
|---|---|---|
| G06F 16/248 | (2019.01) | |
| G06F 16/9535 | (2019.01) | |
| G06F 3/0481 | (2013.01) | |
| G06F 3/0488 | (2013.01) | |
| H04L 29/08 | (2006.01) | |
| G06F 16/951 | (2019.01) | |
| H04L 29/06 | (2006.01) | |

(52) U.S. Cl.
CPC .......... *G06F 16/248* (2019.01); *G06F 3/0481* (2013.01); *G06F 3/04886* (2013.01); *G06F 16/951* (2019.01); *G06F 16/9535* (2019.01); *H04L 67/2842* (2013.01); *H04L 67/42* (2013.01)

(58) Field of Classification Search
CPC ......... G06F 17/30554; G06F 17/30867; G06F 3/04886; G06F 17/30864; G06F 16/248; G06F 16/9535; G06F 3/0481; G06F 16/951; H04L 67/2842; H04L 67/42
USPC ........................................................ 709/231
See application file for complete search history.

(56) References Cited

U.S. PATENT DOCUMENTS

| | | | | |
|---|---|---|---|---|
| 5,222,234 A | * | 6/1993 | Wang | ................ G06F 17/30011 707/999.003 |
| 5,737,734 A | * | 4/1998 | Schultz | ............. G06F 17/30017 |
| 5,845,300 A | * | 12/1998 | Comer | .................. G06F 17/246 715/203 |

(Continued)

*Primary Examiner* — Daniel C. Murray

(57) ABSTRACT

A system and method for asynchronously retrieving information over a network based on incremental input. The system comprises a client part, a communication protocol, and a server part. The server part receives incremental text-based input from one or more objects in the client part, and asynchronously returns matching information to the client part depending on server-defined content channels that each query one or more underlying or connected content sources, such as databases or search engines, to return matches for the latest input and for the latest values and state of other content channels.

12 Claims, 37 Drawing Sheets

(56) References Cited

U.S. PATENT DOCUMENTS

| | | | | |
|---|---|---|---|---|
| 5,903,887 | A * | 5/1999 | Kleewein | G06F 17/30457 |
| 5,974,409 | A * | 10/1999 | Sanu | G06F 17/30864 |
| 6,067,565 | A * | 5/2000 | Horvitz | G06F 17/30861 |
| | | | | 707/E17.107 |
| 6,085,226 | A * | 7/2000 | Horvitz | G06F 17/30902 |
| | | | | 707/E17.12 |
| 6,182,133 | B1 * | 1/2001 | Horvitz | G06F 17/30902 |
| | | | | 707/999.008 |
| 6,208,988 | B1 * | 3/2001 | Schultz | G06F 17/30616 |
| 6,321,228 | B1 * | 11/2001 | Crandall | G06F 17/30864 |
| 6,347,314 | B1 * | 2/2002 | Chidlovskii | G06F 17/30949 |
| 6,415,281 | B1 * | 7/2002 | Anderson | G06F 17/30554 |
| | | | | 707/713 |
| 6,421,675 | B1 * | 7/2002 | Ryan | G06F 17/3061 |
| 6,493,721 | B1 * | 12/2002 | Getchius | G06Q 30/02 |
| 6,519,592 | B1 * | 2/2003 | Getchius | G06F 17/3048 |
| 6,564,213 | B1 * | 5/2003 | Ortega | G06F 17/3064 |
| 6,643,640 | B1 * | 11/2003 | Getchius | G06F 17/3048 |
| | | | | 707/719 |
| 6,826,557 | B1 * | 11/2004 | Carter | G06F 17/30457 |
| 6,832,218 | B1 * | 12/2004 | Emens | G06F 17/30867 |
| 6,871,236 | B2 * | 3/2005 | Fishman | H04L 29/06 |
| | | | | 709/213 |
| 6,934,699 | B1 * | 8/2005 | Haas | G06F 17/30457 |
| 7,181,444 | B2 * | 2/2007 | Porter | G06F 17/3002 |
| 7,606,794 | B2 * | 10/2009 | Carson | G06F 17/30867 |
| 9,514,111 | B1 * | 12/2016 | Cornea | G06F 17/3064 |
| 9,552,412 | B1 * | 1/2017 | Lowe | G06F 17/30646 |
| 9,584,626 | B2 * | 2/2017 | Zhang | H04L 67/42 |
| 9,697,281 | B1 * | 7/2017 | Palmon | G06F 17/30864 |
| 2002/0065933 | A1 * | 5/2002 | Kobayashi | H04L 29/06 |
| | | | | 709/234 |
| 2002/0078045 | A1 * | 6/2002 | Dutta | G06F 17/30675 |
| 2010/0325136 | A1 * | 12/2010 | Chaudhuri | G06F 17/30759 |
| | | | | 707/759 |
| 2011/0035370 | A1 * | 2/2011 | Ortega | G06F 17/2725 |
| | | | | 707/721 |

\* cited by examiner

| ▼ messages | Element | |
|---|---|---|
| @ xmlns | Attribute | http://www.questobjects.com/qo/protocol/v10 |
| ▶ startSession | Element | |

| ▼ messages | Element | |
|---|---|---|
| @ sessionId | Attribute | C39C3F10D9ECE57AA70226FFD98016DF |
| @ xmlns | Attribute | http://www.questobjects.com/qo/protocol/v10 |
| ▶ sessionStarted | Element | |

| ▼ messages | Element | |
|---|---|---|
| @ sessionId | Attribute | C39C3F10D9ECE57AA70226FFD98016DF |
| @ xmlns | Attribute | http://www.questobjects.com/qo/protocol/v10 |
| ▼ registerQuester | Element | |
| @ messageIndex | Attribute | 2 |
| @ name | Attribute | GmVppsField |
| channelId | Element | gm-vpps-vpps |
| license | Element | 0000001 |
| domain | Element | test.questobjects.com@questobjects.com |
| ▶ registerQuester | Element | |
| ▶ registerQuester | Element | |
| ▼ requestDependency | Element | |
| @ messageIndex | Attribute | 5 |
| @ name | Attribute | part |
| questerName | Element | GmVppsField |
| onQuesterName | Element | GmPartField |
| trigger | Element | inputBuffer |
| ▶ requestDependency | Element | |
| ▶ requestDependency | Element | |
| ▶ requestDependency | Element | |
| ▶ requestDependency | Element | |
| ▶ requestDependency | Element | |

| messages | Element | |
|---|---|---|
| @ sessionId | Attribute | C39C3F10D9ECE57AA70226FFD980160F |
| @ xmlns | Attribute | http://www.questobjects.com/qo/protocol/v10 |
| ▸ questerRegistered | Element | |
| ▸ questerRegistered | Element | |
| ▸ questerRegistered | Element | |
| ▸ dependencyGranted | Element | |
| ▸ dependencyGranted | Element | |
| ▸ dependencyGranted | Element | |
| ▸ dependencyGranted | Element | |
| ▸ dependencyGranted | Element | |
| ▸ dependencyGranted | Element | |

```
<querySelector>
  <contentQueryId>lastfirstNameSQL</contentQueryId>
  <selectionCriterion>
    <questerAttribute>INPUT_BUFFER</questerAttribute>
    <selectionPattern><![CDATA[(\w+)\s?,(\w+)]]></selectionPattern>
    <groupToVariableMapping group="1" variable="lastName" defaultValue=""/>
    <groupToVariableMapping group="2" variable="firstName" defaultValue=""/>
  </selectionCriterion>
</querySelector>
```

| QuestField Type | AutoLookup QuestField | AutoComplete QuestField | AutoSearch QuestField | Relational QuestField | FreeForm QuestField | Background QuestField |
|---|---|---|---|---|---|---|
| QUESTFIELD PROPERTIES | | | | | | |
| Relationship to data | One-to-one | One-to-many | Unrelated | Many-to-many | Many-to-many | Any |
| Number of results | 1 | Known | Unknown | Known | Known | Any |
| Listing | None | Alphabetized | Ranked | Custom | Optional | NA |
| Autocomplete | Optional | Full input | Last word (Optional) | Optional | Last word (Optional) | NA |
| Popup list | No | Yes | Yes | Optional | Optional | NA |
| Inputs | 1 | 2 | 1 | Multiple | 1 | Programmable |
| Content channels (Questers) | 1 | 1 | 1 | Multiple | 1 or more | 1 |
| Simultaneous queries | 1 | 1 | 1 | Multiple | Multiple | Any |
| Dependency target | Yes | Yes | Yes | Optional | No | Programmable |

| averageTypingSpeed: | The average typing speed on the target device. (400ms=30wpm keyboard, 1000ms=12wpm iPhone) |
| --- | --- |
| defaultAccumulation: | The default delay time for accumulation. |
| queryLength: | The length of the query string. |
| pendingQueryCount: | The number of pending queries, for which results have not yet been received. |
| averageLatency: | The average network latency. (150ms) |
| minimumQueueTime: | The minimum value for the estimated query time, including latency. |
| calculatedTimeTakenByQuery: | The time between sending a query and receiving the corresponding results. |
| slowQueryDelay: | A slow query delay suggested by a Questlet. (1000ms) |
| Calculated accumulation: | |
| defaultAccumulation = 1.25 * averageTypingSpeed | |
| channelResponseTime = 500ms | |
| minimumQueueTime = averageLatency + channelResponseTime | |
| (initial) queryTime = 2 * (averageLatency + channelResponseTime) | |
| (subsequent) queryTime = Maximum(minimumQueueTime, calculatedTimeTakenByQuery, queryTime - defaultAccumulation) | |
| If pendingQueryCount > 0: | |
|     delay = pendingQueryCount * queryTime | |
| Else if queryTime <= minimumQueueTime and queryLength > 3: | |
|     delay = Maximum(averageLatency, defaultAccumulation / (queryLength - 2) ) | |
| Else: | |
|     delay = defaultAccumulation | |

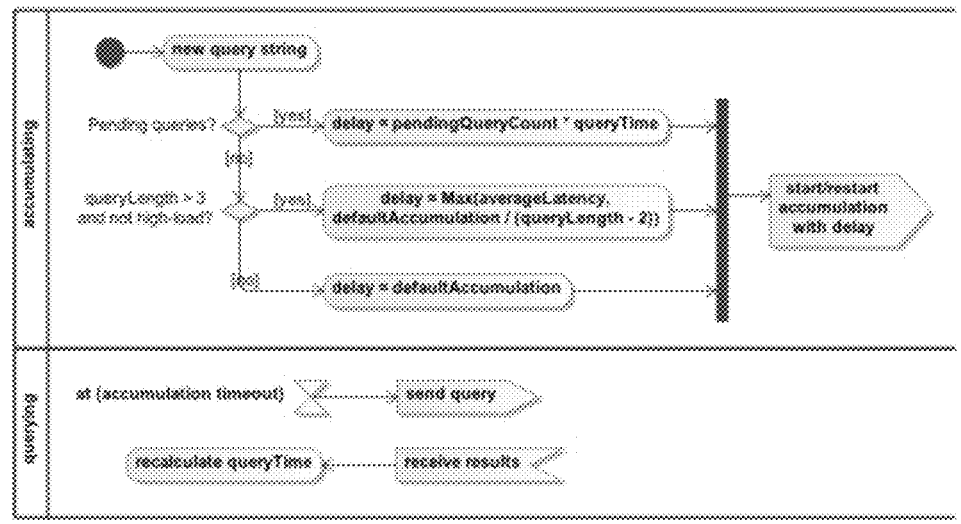

FIG. 25A   370
FIG. 25B
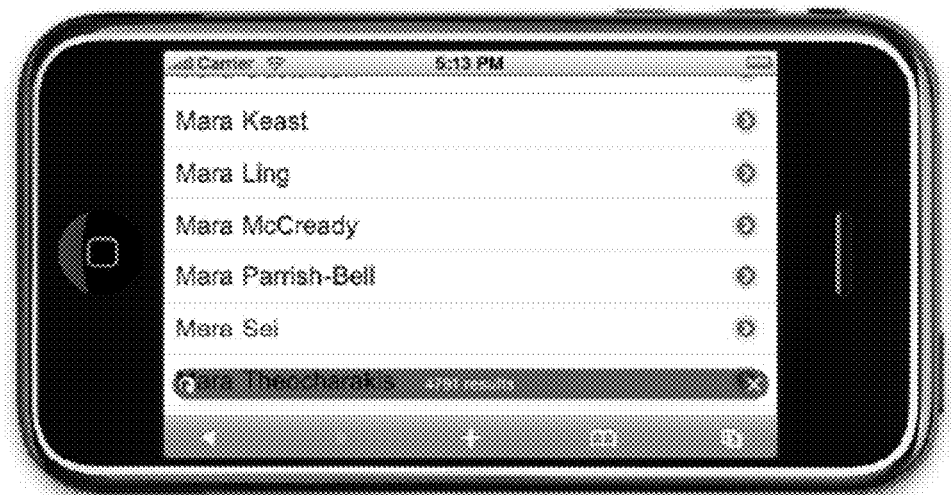
FIG. 25C
372

SYSTEM AND METHOD FOR ASYNCHRONOUS RETRIEVAL OF INFORMATION FROM A SERVER TO A CLIENT BASED ON INCREMENTAL USER INPUT

CLAIM OF PRIORITY

This application is a continuation of U.S. patent application Ser. No. 12/176,984 entitled "SYSTEM AND METHOD FOR ASYNCHRONOUS RETRIEVAL OF INFORMATION FROM A SERVER TO A CLIENT BASED ON INCREMENTAL USER INPUT" filed Jul. 21, 2008. U.S. patent application Ser. No. 12/176,984 claims the benefit to U.S. Provisional Application Ser. No. 60/951,850, entitled "SYSTEM AND METHOD FOR ASYNCHRONOUS RETRIEVAL OF INFORMATION BASED ON INCREMENTAL USER INPUT", filed Jul. 25, 2007. U.S. patent application Ser. No. 12/176,984 is also a continuation-in-part of U.S. patent application Ser. No. 11/257,912 (now U.S. Pat. No. 7,751,326), entitled "SYSTEM AND METHOD FOR UTILIZING ASYNCHRONOUS CLIENT SERVER COMMUNICATION OBJECTS", filed Oct. 25, 2005, which is a continuation-in-part of U.S. patent application Ser. No. 09/933,493 (now U.S. Pat. No. 8,112,529), entitled "SYSTEM AND METHOD FOR ASYNCHRONOUS CLIENT SERVER SESSION COMMUNICATION", filed Aug. 20, 2001. Each of the above applications are herein incorporated by reference and priority benefit is claimed for the present application.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The invention relates generally to client-server, and Internet applications, and particularly to applications where incremental user input is used to retrieve matching content from one or more server systems to dynamically and immediately update the user interface so that users receive immediate feedback based on the input.

BACKGROUND

Increasingly, the Internet is becoming a platform for business, consumer, and government applications that used to be deployed in so-called client-server environments, where computer software had to be installed on both a client system and on one or more server systems. Contrary to most client-server environments, Internet applications are entirely managed on the server. Apart from commonly available (and often pre-installed) Internet browser software such as Microsoft's Internet Explorer, Mozilla's Firefox, Apple's Safari, and browser software built into portable devices, no special software needs to be installed on each user's system. Also, because the Internet is based on widely published and accepted standards managed mostly by the Word Wide Web Consortium (W3C), applications that comply to these standards can be used virtually anywhere.

The advantages of Internet applications are many and are now widely published and generally accepted. Client-server applications are generally much more difficult and expensive to maintain, update, and access. They also scale poorly on the Internet. In addition, traditional client-server applications were often limited to specific client and server platforms, ranging from PC-DOS to Microsoft Windows, Apple Mac OS, Linux, UNIX, Digital OpenVMS, etc. This limited the availability of such applications, and increased the cost of supporting the widest possible user base.

However, traditional client-server applications, through their dedicated support of (and optimization for) specific client and server systems, often excelled in performance and user-friendliness. Even today, moving to a web-based user interface often means a severe degradation of the user experience. Typical Internet applications are based on the so-called "Request-Response Loop", where users only receive information from the server system after they submit a page or a form using a "Submit" button or after pressing the "Enter" key. This mechanism, in its simplicity perhaps one of the core reasons for the very success of the Internet, is inherently primitive compared to what users have become accustomed to in the client-server world, let alone the luxurious interfaces and quick feedback that is received in local applications running on modern GUI-based operating systems such as Microsoft Windows and Apple Mac OS.

SUMMARY

Embodiments of the present invention provide a solution around the limitations of the Request-Response Loop. By providing a generic, virtually direct, connection between individual inputs in user applications and server data that is entered, validated, searched, found, and retrieved, the technology makes it possible to provide immediate feedback based on text-based user input. In accordance with an embodiment, a system and method is provided for asynchronously retrieving information over a network based on incremental input. The system comprises a client part, a communication protocol, and a server part. The server part receives incremental text-based input from one or more objects in the client part, and asynchronously returns matching information to the client part depending on server-defined content channels that each query one or more underlying or connected content sources, such as databases or search engines, to return matches for the latest input and for the latest values and state of other content channels. Additional features and applications are also described herein.

BRIEF DESCRIPTION OF THE FIGURES

FIG. 7A, FIG. 7B, FIG. 7C, and FIG. 7D show the XML structure of various communication packages used in a system in accordance with an embodiment.

FIG. 10A and FIG. 10B show a screenshot of the configuration page used to configure an embodiment so it can provide a content channel and an example of an XML-formatted definition, as it is stored in a corresponding configuration file.

FIG. 11 shows a table describing six basic client embodiments in accordance with an embodiment of the invention.

FIG. 14A, FIG. 14B, and FIG. 14C show illustrations of client user interface element implementations that use dependent content channels in accordance with an embodiment.

FIG. 18A, FIG. 18B, and FIG. 18C show screenshots of various states of an application that uses various client user interface elements that are linked to dependent content channels in accordance with an embodiment.

FIG. 19A, FIG. 19B, and FIG. 19C, show screenshots of various states of a complex user interface that uses various client user interface elements in accordance with an embodiment.

FIG. 23A and FIG. 23B show a table and a flowchart clarifying the way in which an embodiment of the client implements query throttling.

FIG. 25A, FIG. 25B and FIG. 25C show various examples of "full-page" embodiments of the client part of the present invention running on an iPhone.

DETAILED DESCRIPTION

In the detailed description below, various embodiments are described with reference to the QuestObjects system, created by the MasterObjects Company. As described herein, QuestObjects provides a system and method for managing client input, server queries, server responses and client output. One specific type of data that can be made available through the system from a single content source (or a combination of content sources) is defined as a content channel. One or more content channels are considered a QuestObjects Service. Additional glossary is provided in copending U.S. patent application Ser. No. 11/257,912, which is incorporated herein by reference. It will be evident that the technology described herein may be utilized in other embodiments, and with other systems, in addition to the QuestObjects system.

As described herein, QuestObjects is a powerful yet easy-to-use and implement, ultra-thin, smart client/server technology that turns ordinary input fields in HTML pages and in native applications into supercharged mini-client/server environments referred to herein as QuestFields. Each QuestField provides large groups of simultaneous users connected over a network with near-instantaneous access to data stored anywhere on the network. QuestFields, and other products based on the QuestObjects technology, provide an "end-to-end" solution that can link virtually any client system with virtually any data server to provide the kind of data access, search, validation, retrieval and manipulation capabilities similar to capabilities that previously were only possible and feasible with local data.

QuestObjects System

Figure 1:
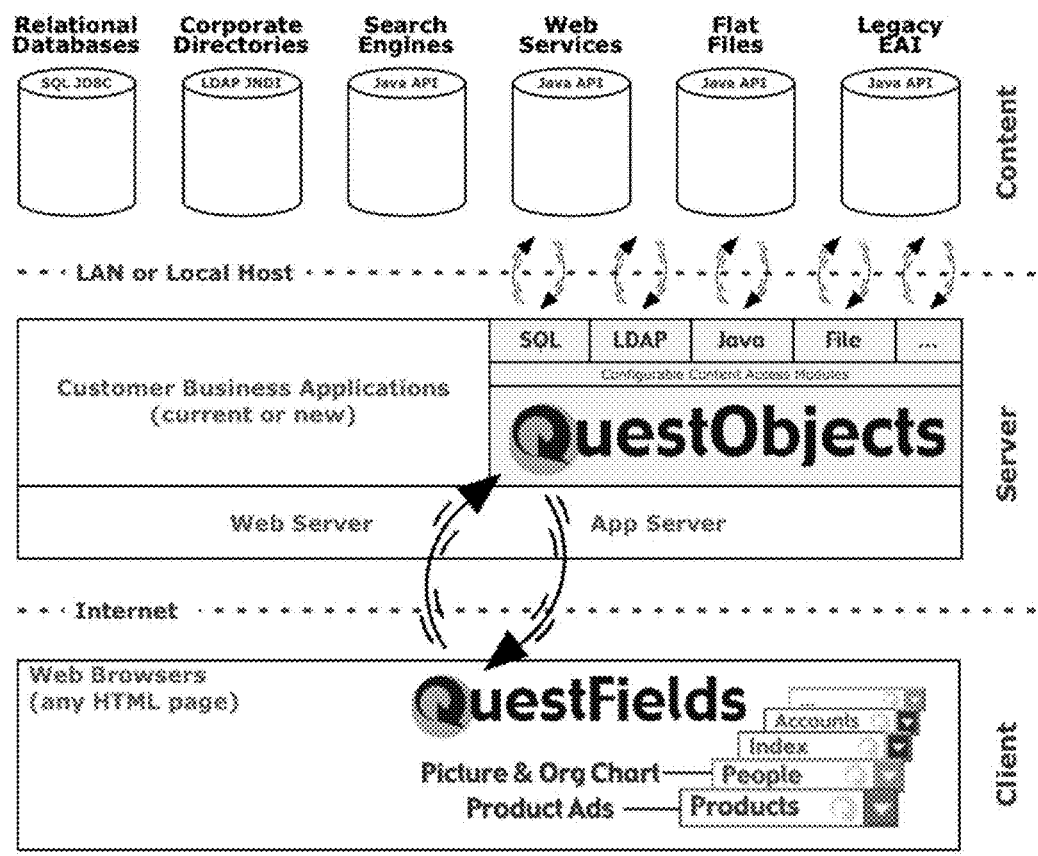
FIG. 1 shows an illustration of a system in accordance with an embodiment, and provides an overview of where said embodiment fits into a typical network infrastructure.

The system underlying the QuestObjects technology provides a highly efficient means to retrieve data from remote content (databases, directories, search engines, web services, XML data, flat files, legacy systems, etc). As shown in FIG. 1, the remote content is typically stored on computers in a server room, accessed over a high-speed local area network, or accessed remotely using a web service or other predefined protocol, and is available to the business applications and to the QuestObjects system through a network connection. The QuestObjects system 100 can be installed on a server alongside existing business applications, and runs in an application server such as the open-source Apache Tomcat or commercial application server software such as IBM Web Sphere, BEA WebLogic, and Microsoft ASP.Net server, all of which might also host other applications simultaneously. The application server(s) serve the dynamic content of web pages, the static portions of which is typically served from a static web server for scalability and performance reasons (such as Microsoft's Internet Information server or Apache HTTP server). Web and other applications accessing the server system contain one or more client parts, which are usually referred to as "QuestFields". The client part and the server part typically communicate over the Internet, over either broadband or low-bandwidth connections even as slow as those provided through telephone modems and GPRS cell phones. The QuestObjects protocol connects the QuestObjects client (QuestField) and the QuestObjects server in a highly efficient manner that only transmits data over the network that is needed by the individual parts at any time. By using standard HTTP as one possible low-level protocol implementation, QuestFields can work in standard Internet environments and infrastructures including firewalls, proxies, and load balancers.

Figure 2:
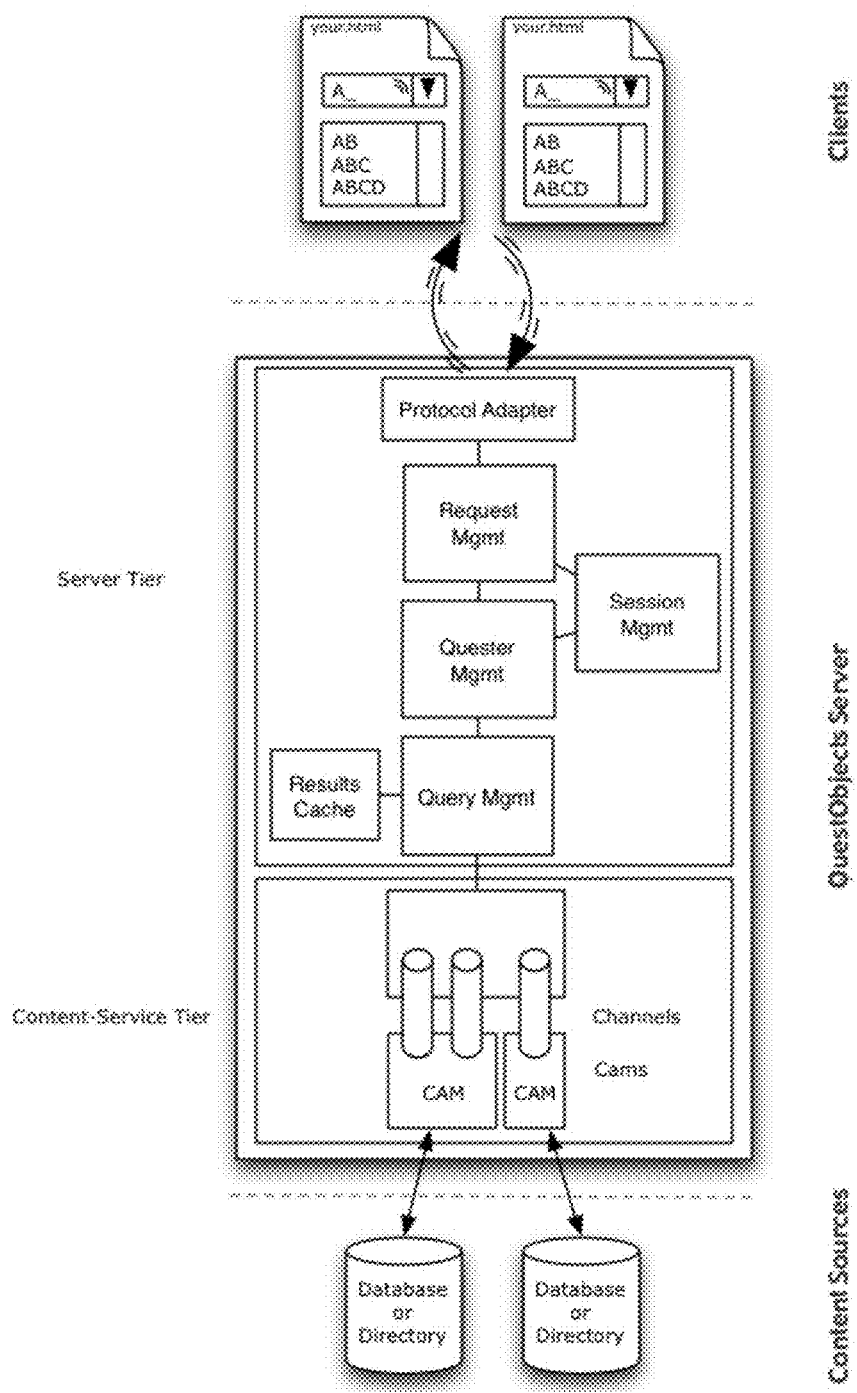
FIG. 2 shows an illustration of a system in accordance with an embodiment, notably the client part, the Communication protocol, the server part divided into a "server tier" and a "service tier", and the content sources accessed by said embodiment.

FIG. 2 illustrates the objects that implement an embodiment of the QuestObjects system 110. As shown in FIG. 2, the QuestObjects server uses a protocol adapter to communicate to QuestObjects clients. This adapter translates the request and response messages going over the network into a format appropriate for the network. For example, in most Internet applications the messages are transmitted over the HTTP(S) protocol and are formatted using XML. The QuestObjects server comprises a "server tier" and a "content-service tier".

In accordance with an embodiment, the server Tier manages client sessions and requests. The server tier communicates with potentially large numbers of QuestObjects clients using, in one embodiment, an efficient XML-based protocol referred to as the QuestObjects Protocol (QOP). In accordance with this embodiment, the protocol uses HTTP or HTTPS over TCP/IP. By optionally maintaining a session for every active user, the QuestObjects server can greatly reduce network traffic by sending to each QuestObjects client only the data that is needed immediately by that specific client and that was not already communicated in a previous message to that client. The server tier optimizes performance by caching content after it is received from the content-service tier. Each query is checked by a query manager against this cache (entries in which typically expire after a limited amount of time, depending on the time during which the content is considered current and defined in the content channel configuration described below). A QuestObjects client implementation can access one or more predefined content channels. For each content channel, the corresponding client information and results are maintained in a logical object referred to as a Quester. Quester objects are instantiated immediately after a client session is established and as the client session registers an interest in a content channel.

Content that is not yet available in the server tier cache is retrieved from the Content-Service Tier, which accesses one or more content sources, which in turn can be physically located outside the QuestObjects system. The QuestObjects server communicates with these back-end data stores (databases, directories, search engines, web services, files, etc) using their native protocols, such as SQL or LDAP, or any other standard or proprietary protocol using a generic API that supports plug-ins that can be programmed using standard programming languages such as Java or C#. Each type of content source is accessed through a corresponding abstracted object referred to as the "Content Access Module" (CAM). Each CAM is capable of communicating with an underlying content source using its native language, protocol, or format. In the QuestObjects server, predefined content channels determine the content (coming from one or more content sources) that is retrieved by the QuestObjects clients that register themselves for each content channel. It should be noted that in various embodiments, the content-service tier can be located on different computer systems, where the server tier and the content-service tier communicate over a fast network. The server tier can be installed on multiple (load-balanced) computer systems to provide improved scalability in session and request handling. The service tier can be distributed over multiple computer systems to provide dedicated services for distributed content sources, where each copy of the content-service tier embodiment serves one or more content channels defined on it.

In accordance with an embodiment there can also be a cache (or even a full in-memory copy of the data) in the content-service tier, although this level of caching is often provided by the content sources themselves. Embodiments of the content-service tier can also pre-fetch often-accessed results from the content source(s), in order to optimize the speed of QuestObjects client requests that can be anticipated, and possibly to fill the QuestObjects caches after a restart of the system. The contents of the caches can also be serialized and written to disk before a restart, so that the QuestObjects server can maintain its performance by re-loading its cache into memory after a restart.

Figure 3:
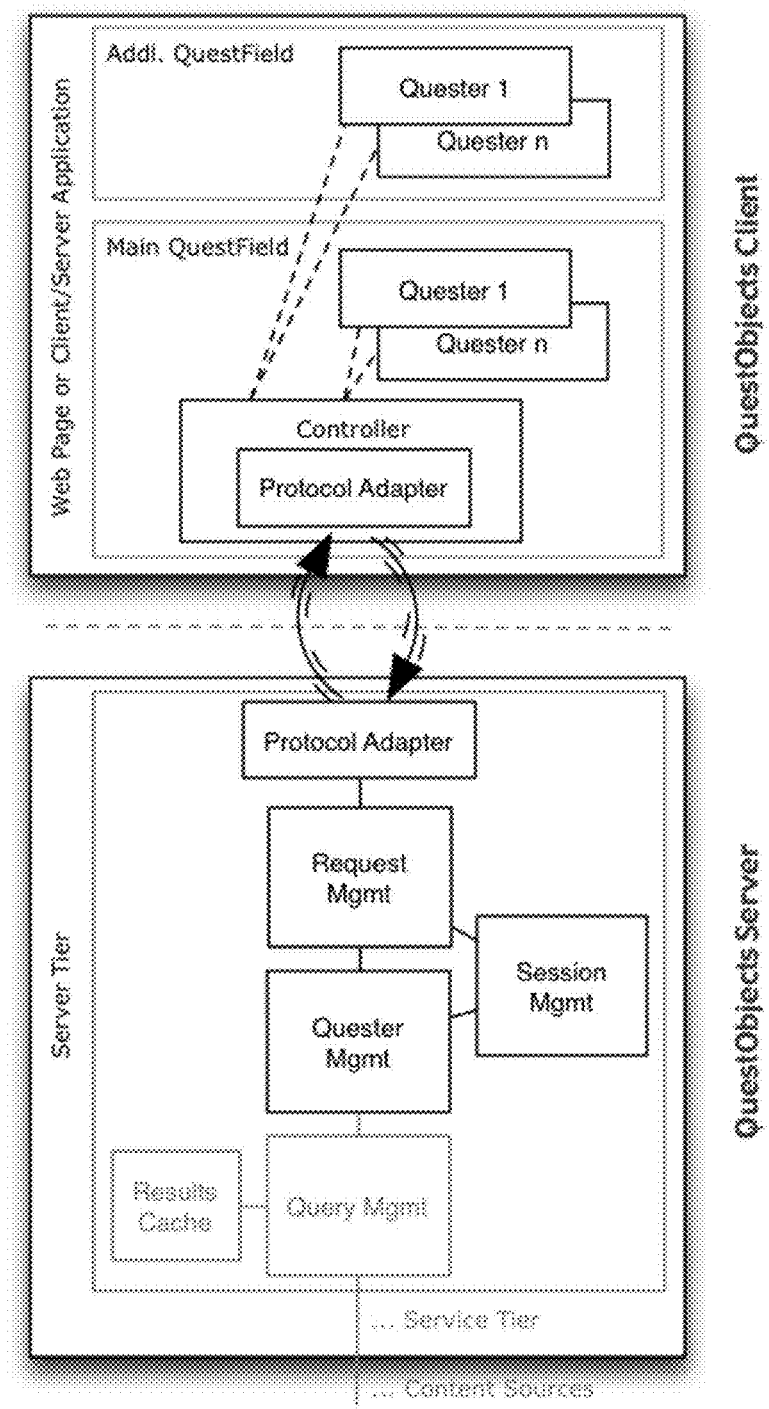
FIG. 3 shows an illustration of a client system in accordance with an embodiment and the relationship of its objects to the server system.

FIG. 3 illustrates data objects in the QuestObjects client corresponding to the server-side Questers. In accordance with an embodiment 120, each client-side Quester maintains the client-side input (typically comprising user input, i.e. characters typed by a user, the state of user interface elements clicked, the selection state of the cursor, and optional qualifiers that are included with client requests), and transmits changes to the QuestObjects server as they occur, or delayed and coalesced if they occur in quick succession. For efficiency reasons, multiple client-side Questers can share a single session with the server, which is managed by the client-side Controller, and which is instantiated as a separate object, typically by the first client object that needs it. The Controller can remain alive even after the first client object is no longer needed, as might be the case in a multi-window application or in situations where a client object disappears because a tabbed pane is hidden or deactivated. Like the server, a QuestObjects client may also communicate through a protocol adapter, allowing it to connect to the QuestObjects server using the appropriate low-level communication protocol implementation (such as XML, over HTTP over TCP/IP).

Embodiments of a QuestObjects client can implement a local cache of results that they have received from the server. In some embodiments, QuestObjects clients hold a copy of the latest result set received from the server, e.g. allowing users to scroll up and down through those results that have already been received without needing repeated round-trips to the QuestObjects server. Other embodiments of a QuestObjects client can also cache the results of prior queries in order to increase system performance even further, avoiding additional unnecessary repeated round-trips between the QuestObjects client and the QuestObjects server.

Core Data Objects

Figure 4A:
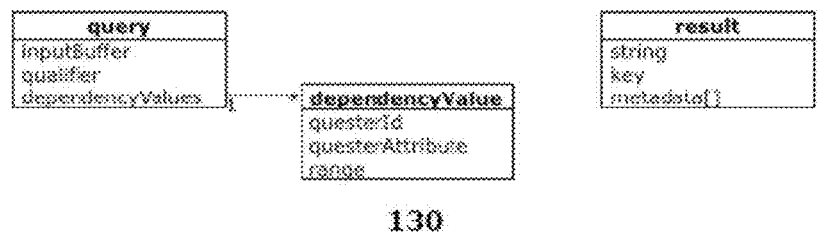
FIG. 4A, FIG. 4B and FIG. 4C show UML class diagrams of the basic data classes used in an embodiment.
Figure 4B:
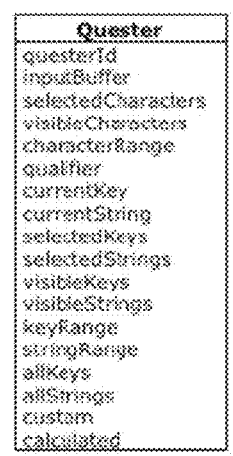
Figure 4C:
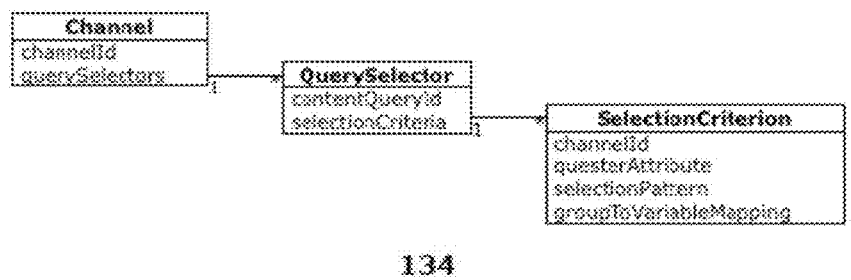

Embodiments of the present invention provide a highly efficient solution that can be considered completely generic because of the nature of requests and responses traveling through the system. FIG. 4A, FIG. 4B, and FIG. 4C show the basic objects that are involved in this method. In particular, FIG. 4A shows that a query 130 comprises user input (referred to as the inputBuffer and typed as a string of characters) with optional qualifier string (which is typically specified by the application designer or selected by the user using a third-party user interface element) and zero or more values derived from attributes of the same or other Questers. In the QuestObjects server, each Quester has a unique identifier (id). A query fired by one Quester can include any number of dependent values derived from properties identified in the dependency Value object. The dependent Quester values are derived from (but not limited to) the attributes 132 shown in FIG. 4B.

The result object in FIG. 4A shows that results received from the content sources (or, if the exact same query was executed earlier by the same client or any other client, retrieved from the cache) also use a generic format. In accordance with an embodiment, each result comprises a string with an optional key that uniquely identifies the result in the underlying content source, optionally allowing the QuestObjects server to retrieve additional data from the content source when requested at a later time, and used to combine identical results that were received from multiple content queries executed in the content channel in the content-service tier of the system. The content source can also return optional metadata to the QuestObjects system, which is an array of zero or more strings.

In accordance with some embodiments, only information that is required by the various parts of the system needs to be communicated between these parts at any time. For example, if a QuestObjects client only needs to display the first 20 records from a result set ("results"), then only those 20 records will be transmitted to the QuestObjects client by the QuestObjects server, even if the QuestObjects server may have received many more records from the content source. If one Quester's query depends in part on the values held by attribute(s) of another Quester, then the values of that other Quester do not need to be communicated to the QuestObjects server by the QuestObjects client, because the server-side Quester manager maintains the values and data referenced by each Quester instance. A QuestObjects client can be considered a "view" on the information held in the server. Only input changes (such as characters typed, cursor selections, and list selections) need be communicated to the QuestObjects server, and only a limited subset of the results typically needs to be transmitted back to the QuestObjects client. The QuestObjects client can request additional "ranges" of results when and if they are needed.

In the content-service tier, each content channel defines the data that is queried and returned. In accordance with an embodiment each content channel does so using one or more querySelectors 134 (see FIG. 4C). Each query selector selects or skips a predefined content query by applying a selection pattern (typically in the form of a regular expression) to a specific Quester attribute for the same content channel or any other content channel. If the selectionPattern returns one or more values, then the corresponding content query is executed. The content query receives the corresponding values using a so-called groupToVariableMapping object that contains a key-value pair for each consecutive value derived from the query by the pattern.

The objects in FIG. 4 have been simplified for clarity. In accordance with some embodiments each object can have additional attributes that implement the functionality described herein. For example, each result object, or a complete result set, can carry with it an expiration time stamp, so that each part of the QuestObjects system can determine whether said result(s) are still valid, or whether they need to be re-fetched from the content source.

Request and Response Handling

Embodiments of the invention can provide asynchronous feedback based on server-side data and incremental client (typically, user) input. Information is exchanged between the QuestObjects client and the QuestObjects server. The following description describes the asynchronous nature of the consecutive messages (requests and responses) that are exchanged between the client and the server. In accordance with an embodiment individual messages can use XML (as further described in U.S. patent application Ser. No. 11/257, 912). Those skilled in the art will understand that, through protocol adapters or other means, the format of the messages can be changed while remaining within the scope of the invention. Also, it will be evident that the embodiments described here are designed to offer a generic solution to make it possible to deploy multiple Questers with dependencies. In simpler embodiments of the invention, certain complexity can be omitted.

In accordance with an embodiment, certain communication messages can be omitted. For example, if only one client Quester uses only one server-side content channel, then no "registerQuester" and "questerRegistered" messages are needed as they could also be implied. In simplified implementations where no paging through results of a prior query or dependencies between multiple Questers are required, no session object (and related "startSession" and "sessionStarted" messages) is needed. Such limited protocol implementations, where the message formatting and transport are simplified while still communicating messages asynchronously conveying essentially the same meaning to achieve the same result to the world outside of the embodiment, still fall within the scope of the invention. Also, the messages described below have been simplified to better convey their meaning. For example, if a message is referred in the text below to as "query A", then the message will likely hold a query id that is generated by the QuestObjects system and that represents the actual query object, the information of which is only transmitted to the QuestObjects server once. These implementation details do not change the meaning and essence of the information exchanged between the various parts of the system.

Figure 5A:
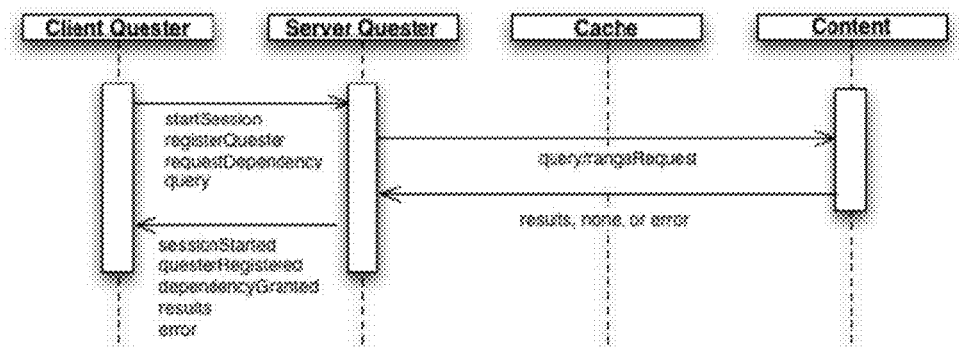
FIG. 5A, FIG. 5B, and FIG. 5C show UML sequence diagrams of typical events that occur in a basic embodiment that uses a single content channel.
Figure 5B:
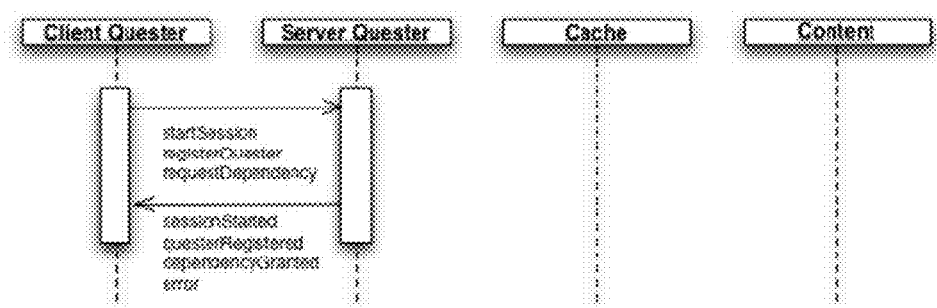
Figure 5C:
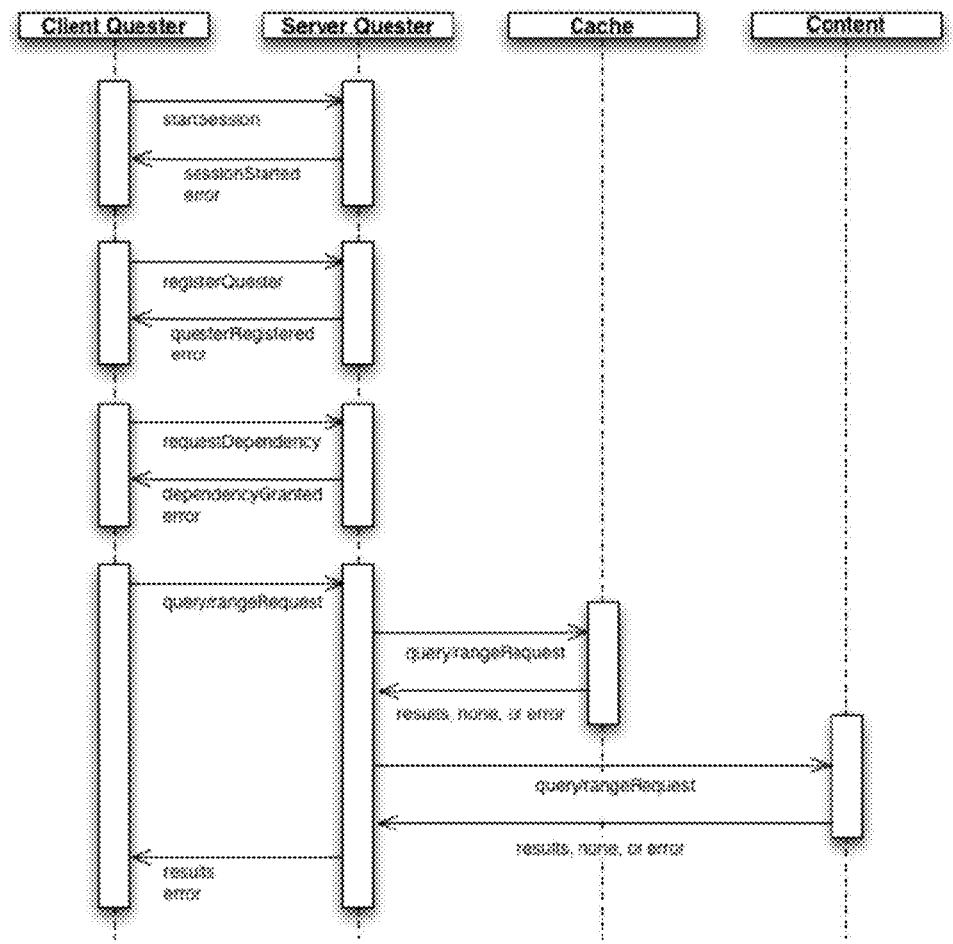

FIG. 5A, FIG. 5B and FIG. 5C show a typical sequence of events as they flow through the QuestObjects system. In accordance with an embodiment, in its first request, the client Quester starts a session. It then registers one or more Questers, telling the server which content channels it would like to use. Each Quester may request dependencies on values corresponding to attributes of other Questers. Once this initialization phase is finished, the QuestObjects client can start performing queries and receive results. The consecutive queries usually happen upon user input, but an initial query based on a default value and/or qualifier can also be performed automatically at the end of the initialization phase, and clients can also be used to receive "pushed" updates using a request-response exchange at regular or irregular intervals from the QuestObjects server.

As shown in sequence diagram 140 of FIG. 5A, the information required by the QuestObjects server during the initialization phase can be combined into one message to the QuestObjects server by the client, upon receipt of which the QuestObjects server performs the corresponding actions and returns a single message. Note that any of the steps can fail, in which case the server returns an error message. In most situations, however, the initialization phase is distributed over time, wherein multiple consecutive messages are exchanged between client and server. This is shown 144 in FIG. 5B and 148 in FIG. 5C. In the latter case, multiple client objects can be instantiated independently of each other. Thus, a Quester can request a dependency on another Quester that was instantiated before it. And a complex dynamic user interface may add and remove Questers and corresponding dependencies as the user navigates through an application, wherein all Questers that are instantiated and destroyed over time share the single session with the QuestObjects server.

Although a QuestObjects client can request dependencies from the QuestObjects server (as depicted in these figures using the requestDependency message) based on pre-configured dependent user interface elements, the QuestObjects server may also return a list of possible dependent content channel names to the QuestObjects client (with each questerRegistered message). In the latter case, a QuestObjects client can dynamically build its user interface by instantiating client objects based on the available dependencies. Some dependent content channels may have a "used as filter" flag, which signifies to the QuestObjects client that a dependency can be used as a filter in the client user interface (which is further described below with regard to FIG. 19B and FIG. 19C).

As shown in figures FIG. 5A and FIG. 5C, the QuestObjects server can query the underlying content source (through the content channel corresponding to the Quester that was registered, wherein the content channel can query one or more predefined content queries) upon receiving a query or rangeRequest message from the QuestObjects client. FIG. 5C shows that the content source is not re-accessed if the same query was performed already. Instead, the content is retrieved from the QuestObjects server cache.

FIG. 6A, FIG. 6B, FIG. 6C, FIG. 6D, FIG. 6E show the events 150-160 that can occur in an embodiment that handles multiple subsequent client actions in a QuestObjects session, as well as the sequence of events that happens for multiple dependent Questers where the change event of an attribute in one Quester triggers a new query in one or more dependent Questers.

Figure 6A:
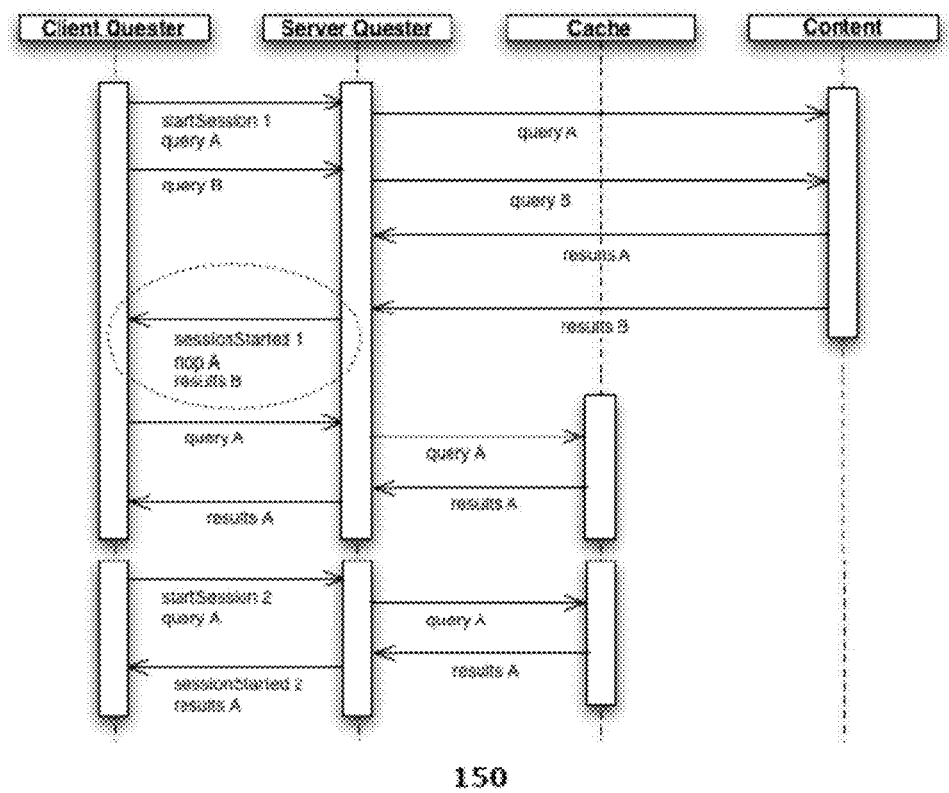
FIG. 6A, FIG. 6B, FIG. 6C, FIG. 6D, and FIG. 6E, show UML sequence diagrams of typical events that occur in a complex embodiment that uses multiple dependent content channels.

In FIG. 6A, a first query A is transmitted to the server, which in turn queries the underlying content source. Before information is returned from the content source, a new query B is transmitted from the client to the server, which also sends this query to the content source for retrieval of the appropriate data. At this point, the results for query A are no longer deemed of importance to the client Quester. In accordance with an embodiment, depending on the capabilities of the connected content source, the content query A can be interrupted or canceled. In typical embodiments, however, query A will still be allowed to finish on the content source, ensuring that the corresponding results will still appear in the QuestObjects cache, which increases the throughput for other QuestObjects clients that happen to perform the same query A at a later time, or for the same QuestObjects client if it re-requests the same query, as might be the case in a user interface after a user types the backspace key to return to the previous input string. In FIG. 6A, the result for query A is returned to the QuestObjects server by the content source, but no immediate results message is sent to the client Quester because it is no longer the information that the client is waiting for.

Figure 6B:
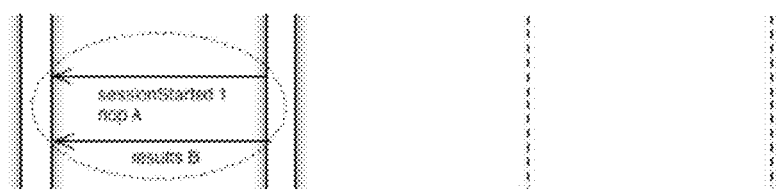

Once the results for query B are received from the content source, the client is informed that the results for query A were skipped and the results for query B are returned to the client. As is the case with most messages, depending on the particular embodiment, these messages can be combined into one communication package (shown in the circled area of FIG. 6A) or transmitted as separate communication packages as shown in FIG. 6B. The latter is typical of implementations that use TCP/IP, where each consecutive HTTP request from a QuestObjects client to QuestObjects server is expected to return a response.

The end of the first event sequence as shown in FIG. 6A depicts what happens if the same client session re-requests query A. At this point, the server already has the results for query A in its cache, so it can quickly return a results message to the client. If another QuestObjects client (for example, another user) requests the same query A before the corresponding results have expired, then the QuestObjects server can also return those results from its cache.

No system has unlimited capabilities. With this in mind, embodiments of the QuestObjects system are designed to provide the best possible throughput while minimizing the load on its various parts. In many cases, the real bottleneck in the system is not the system itself, but the performance and capabilities of the connected content source(s). Databases, search engines, web services, etc, typically can only handle a limited number of simultaneous queries. Each query can also take up to seconds before it returns results. So, if the QuestObjects system fired a content query for every single request received from every QuestObjects client, this would cause performance problems. An embodiment of the QuestObjects system addresses this by not firing content queries unless they are really needed, and by limiting and managing the number of simultaneous queries that can be fired against a specific content source. Another solution to slow-performing content sources can be provided by an embodiment in which data from the content source is pre-read and indexed by the QuestObjects system so that no further communication with the content source is needed (as further described below with regard to FIG. 26).

Figure 6C:
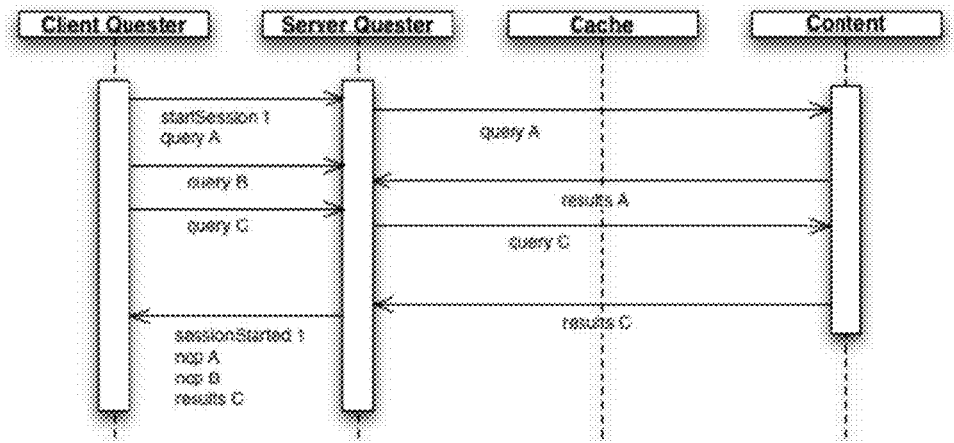

FIG. 6C shows an embodiment that addresses high-load situations, where the QuestObjects server receives a query A from a QuestObjects client (which is accepted by the content-service tier and fired against the content source). At the moment when a subsequent query B is received from the (same or different) client, however, the load on the content source is too high. Rather than firing query B against the content source, it is queued in the server-side Quester. At the moment where the content source is ready to accept a new query, the QuestObjects server determines whether query B is still the latest query. If it is no longer the latest query (as is depicted in FIG. 6C), query B is not fired against the content source. Instead, query C is fired, and eventually returns its results to the client. As a result, at the end of the sequence diagram in FIG. 6C, the QuestObjects server will have the results for query A and query C in its cache, but only the results for query C will have been transmitted to the QuestObjects client.

As illustrated in the example of FIG. 6B, the three or four resulting "sessionStarted", "nop" and "results" messages shown in FIG. 6C can also be returned to the QuestObjects client as separate communication packages, depending on the low-level protocol implementation.

Similarly to the scenario in which a QuestObjects client does not always need to receive the entire result set from the QuestObjects server, the QuestObjects server does not always need the entire result set from a content source. Embodiments of the QuestObjects server can apply "paging" through results in a content source, using the native protocol of the content source. In some instances a content source can return its results in batches, perhaps because retrieving the entire result set from such a content source would otherwise take too long, leaving the QuestObjects client "in the cold", even though part of the result set could have already been available.

Figure 6D:
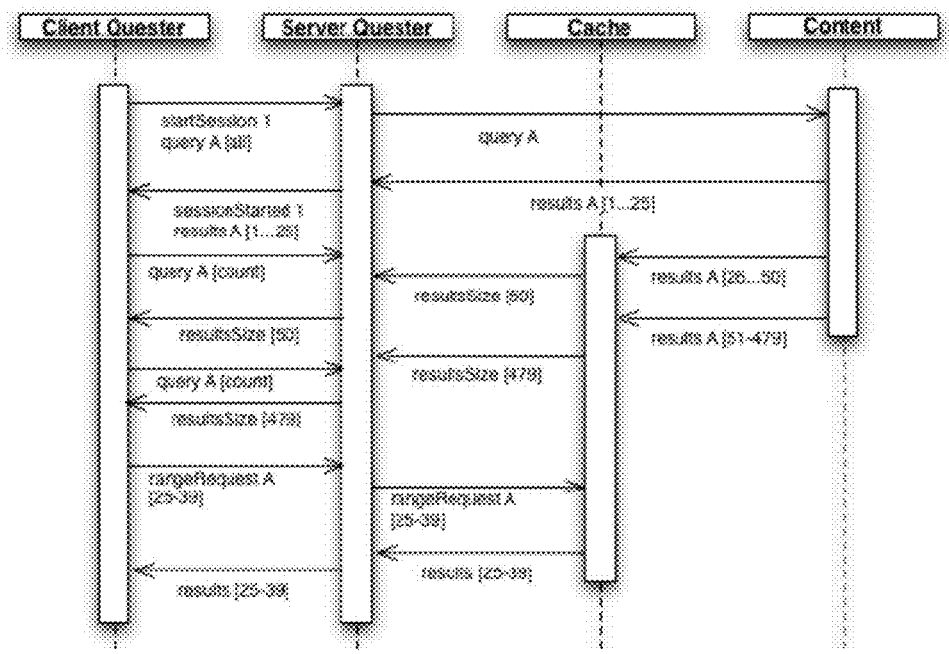

FIG. 6D shows how this can be performed in accordance with an embodiment. Even though a QuestObjects client requests "all" results for a query A, the content source starts by returning the first 25 results, which are immediately communicated back to the QuestObjects client by the QuestObjects server. The results message holds a "more available" flag, which causes the QuestObjects client to send a new request ("query A [count]") to the QuestObjects server.

Assuming that the QuestObjects client only needs batches of, say 25 results or less at any time, the QuestObjects server does not return the subsequent additional results as they come back from the content source. Instead, the results from the content source are cached in the server, and are subsequently transmitted to the QuestObjects client upon receiving a "rangeRequest A" message.

Figure 6E:
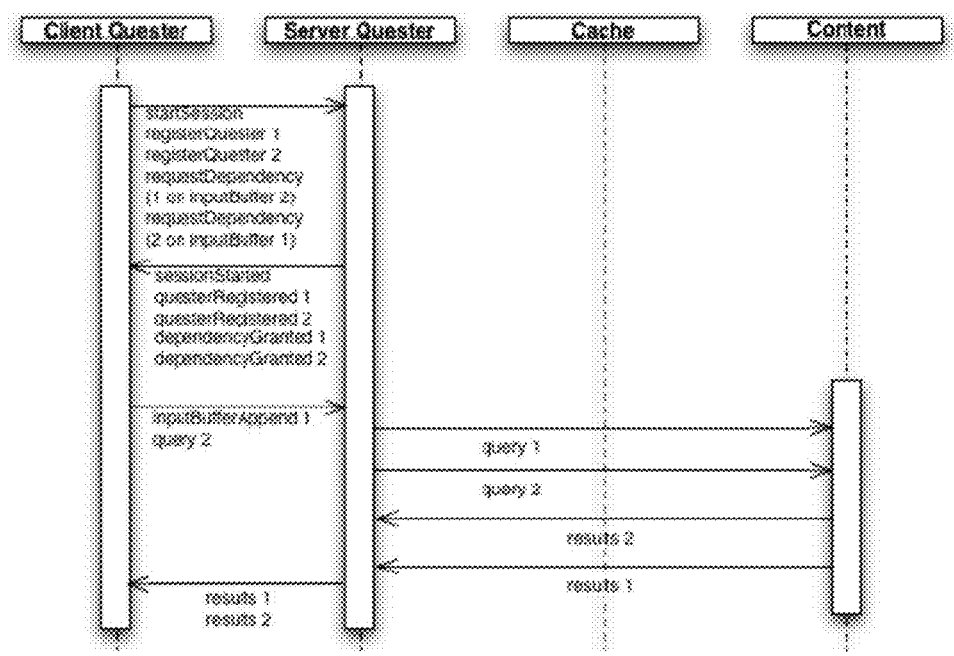

FIG. 6E shows the information that is exchanged between the QuestObjects server and the QuestObjects client in order to implement two dependent Questers. Each Quester registers itself for a content channel that has a predefined dependency on the content channel of the other Quester. Once this information is exchanged between the QuestObjects client and the QuestObjects server, the QuestObjects client can request new results for Quester 2 whenever the value of the dependent attribute in Quester 1 changes. In FIG. 6E, query 2 is transmitted as soon as a character is appended to the inputBuffer of Quester 1. The server can combine the values (in this case, the input buffers) of the two Questers to fire the underlying content queries in the content source(s). After the results for both Questers have been received, they are returned to the QuestObjects client.

As described in previous examples, dependent Questers can use paging through ranges, and incremental fetching of information. Low-level protocol embodiments can combine or separate messages into one or more communication packages, as long as the sequence of information exchanged remains. FIG. 7A, FIG. 7B, FIG. 7C, and FIG. 7D illustrate this with multiple Quester dependencies, and shows how four subsequent messages can be exchanged to set up these dependencies. The startSession 170 and sessionStarted 172 messages of FIG. 7A and FIG. 7B are typically exchanged as soon as the QuestObjects client objects are instantiated. In embodiments working in a web browser, this can be right after the page loads, or even while the page is loading. To reduce the load on the QuestObjects server, this exchange can also be deferred until a user first accesses one of the user interface elements linked to one of the Quester.

It will be evident to those skilled in the art that sessions can be identified in various ways depending on the client and server embodiments. For example, in a web browser implementation, the session information can be transmitted as part of each subsequent request and response or as part of the URLs, where the session information is held in memory on the QuestObjects client. A QuestObjects client can also persist the session information by storing it in a "Cookie", or by using a different persistence mechanism such as using a "Local Shared Object" in Adobe Flash. Also, as described previously, in simple implementations where no paging or dependencies are needed no session need be maintained either.

FIG. 7C and FIG. 7D show how the QuestObjects client and the QuestObjects server exchange information 174, 176 about multiple dependencies by exchanging a single request package and a single response package containing multiple registerQuester, questerRegistered, requestDependency, and dependencyGranted messages, as would be required in application embodiments like the design implementation described below in FIG. 18.

Configuration

In accordance with an embodiment, the QuestObjects server application can be configured using XML-formatted configuration files stored in a directory on the file system referred to as the "QuestObjects configuration folder". FIGS. 8A-D show shows an example of the files 182 stored in such a configuration directory. The QuestObjects server automatically reconfigures itself after these files are modified. It is possible to maintain multiple instances of the QuestObjects server running on the same or on multiple machines by simply replicating the configuration directory, i.e. copying the files.

In accordance with an embodiment, the "cams" directory contains configurations that tell the QuestObjects server how to communicate with the various content sources it is to access. This directory contains a named file for each Content Access Module instance (CAM). The CAM configuration parameters depend on the type of content source. For example, a JDBC CAM for SQL databases contains the database user name and password used to log on to the database, the JDBC (Java Database Connectivity) driver name and connect string, the maximum number of simultaneous connections (the session pool), the maximum and minimum number of idle sessions, the maximum session pool waiting time, and an SQL query definition that is used to test the availability of the database. Other types of Content Access Modules require different configuration attributes depending on the type. For example, a file CAM may require the file format (such as Tab-delimited, or Microsoft Excel) and an LDAP CAM may require a list of server URLs for failover purposes. The purpose of a CAM is to abstract the various kinds of content sources available to the QuestObjects system. The rest of the QuestObjects system does not need to be aware of the differences between the various content source types. Optionally, each CAM instance also defines cache settings for the results to be cached in the content-service tier cache, and holds information on pre-fetching of popular queries from the content source.

In accordance with an embodiment, the "channels" directory contains a configuration file for each content channel that is defined in the system. The "content-service" file shown in FIG. 8A contains a configuration containing technical settings for the content-service tier of the QuestObjects server. This can include the logging level and information about statistics that are collected during the use of the QuestObjects system, which in turn can aid system administrators in fine-tuning and troubleshooting. The content-service tier statistics are used as a basis for license verification (e.g., a QuestObjects server may only be licensed only for X number of queries per time frame, or a content channel may be limited to a certain number of unique records), as a source for usage billing and advertising "hit counts", to deduct the most popular queries, etc. Optionally, the content-service configuration file contains technical settings that configure the content-service tier in-memory cache.

The "content-queries" directory contains configuration files corresponding to all content queries defined in the QuestObjects server. This configuration is described in detail for FIG. 9B below.

Figure 8A:
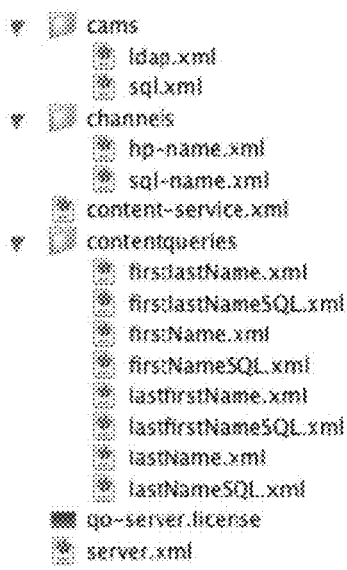
FIG. 8A and FIG. 8B show illustrations of various configuration files and a screenshot of the corresponding configuration application used in an embodiment.

In accordance with an embodiment, the "qo-server.license" file shown in FIG. 8A contains an encrypted license file that restricts the QuestObjects server software to only a limited set of features and/or uses. For example, the QuestObjects server might be configured to only allow specific (numbers of) CAMs, content channels, content query definitions, queries per day, restrict access to the QuestObjects server to non-SSL versus SSL, restrict access to the QuestObjects server from a limited number of Internet domains, etc. The license file can also include information identifying the licensee.

The example "server.xml" file shown in FIG. 8A contains technical settings for one QuestObjects server software instance. Multiple instances of a QuestObjects server can be run off the same configuration directory, wherein each instance has its own configuration file and can thus have its own system usage settings (e.g. relating to memory and thread use by that server instance on the computer hardware on which it runs). The server configuration file can also include settings relating to logging level, session management (such as the maximum number of simultaneous sessions), request management (such as the maximum number of requests that is handled at the same time and the size of the various request queues), caching settings (such as the maximum amount of memory to be used for the cache), and server tier statistics collection configuration.

When launched, the QuestObjects server software reads configuration information from the corresponding configuration directory shown in FIG. 8A. Changes to the QuestObjects server configuration can also be made while the QuestObjects server is running. One embodiment allows configuration changes using the JMX standard (Java Management Extensions), allowing configuration of the QuestObjects server software from third-party applications and management tools.

Figure 8B:
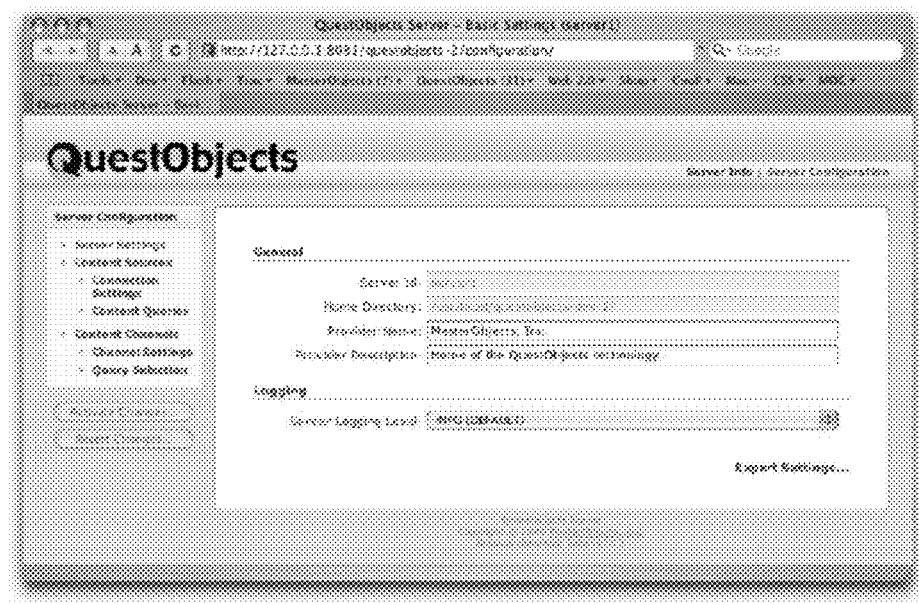

In accordance with some embodiments, a bundled QuestObjects server management application can be provided that allows dynamic (re-) configuration of the QuestObjects system using a web browser interface 184, as is shown in FIG. 8B. This browser-based configuration tool dynamically configures the QuestObjects server through JMX calls. Users can access the application from a web browser by typing the corresponding URL and authenticating. Users can also make configuration changes depending on their assigned role(s). For example, the role "qo-view" only allows users to view the configuration. Role "qo-admin" allows a system administrator to shut down and start up the QuestObjects server, manage other server processes, and manage technical settings such as memory and cache configuration. Role "qo-config" allows users to configure the QuestObjects server's logical configuration settings, such as the content channels, CAMs, and content queries.

The configuration application is accessed by clicking on "server Configuration" at the top of the screenshot in FIG. 8B. Any standards-compliant web browser can be used to configure the QuestObjects server. Users navigate through the various configuration options by clicking on menu items shown on the left of the screenshot. The various configuration attributes for each configuration are displayed on the right. Infrequently used and complex settings can be hidden in a separate "Expert Settings" window. The "server Info" link at the top of the screen opens a window that displays information about the QuestObjects server instance, including the version number of the software, the number of active sessions, or the number of queries handled.

In accordance with an embodiment, configuration changes can be made in a "sandbox", which allows multiple attributes to be modified, added, removed, etc, without becoming active immediately and thus without interfering with the correct operation of the QuestObjects server. After making any configuration changes, an "Activate Changes . . . " button allows the system administrator to activate the changes and a "Revert Changes . . . " button undoes the latest changes that were made in the sandbox.

Before the activation of changes happens, the QuestObjects server verifies their validity. A running QuestObjects server application will thus not be harmed by mistakes made in the configuration application, or in any other application that changes the configuration through JMX.

Figure 9A:
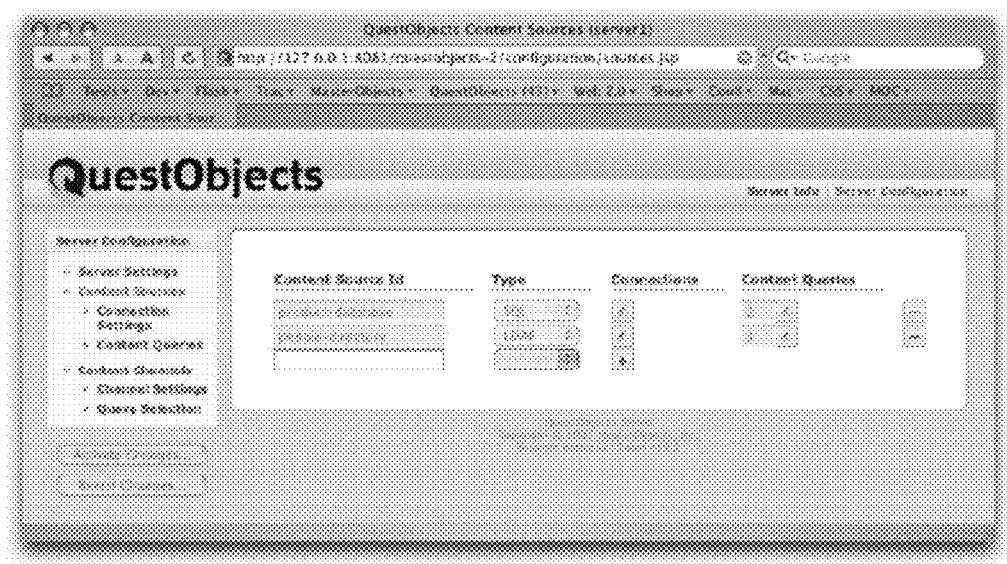
FIG. 9A and FIG. 9B show screenshots of the configuration pages used to configure an embodiment so it can connect to underlying content sources.

FIG. 9A, FIG. 9B, FIG. 9C and FIG. 9D show an example 190 of how CAMs and content queries are configured in accordance with an embodiment. Each CAM instance is labeled a "content source" and is configured using configuration attributes that depend on the type of content source as described earlier. FIG. 9A shows the state of the "content sources" screen after configuring a content source using the SQL CAM, and one using the LDAP CAM (Lightweight Directory Access Protocol). After clicking on the "Connections" button, a new screen appears that allows the user to configure the CAM instance. New content sources are added by entering a unique Id, selecting the content source type, and clicking on the "plus symbol". Content sources are removed by clicking on the "minus" symbol.

Figure 9B:
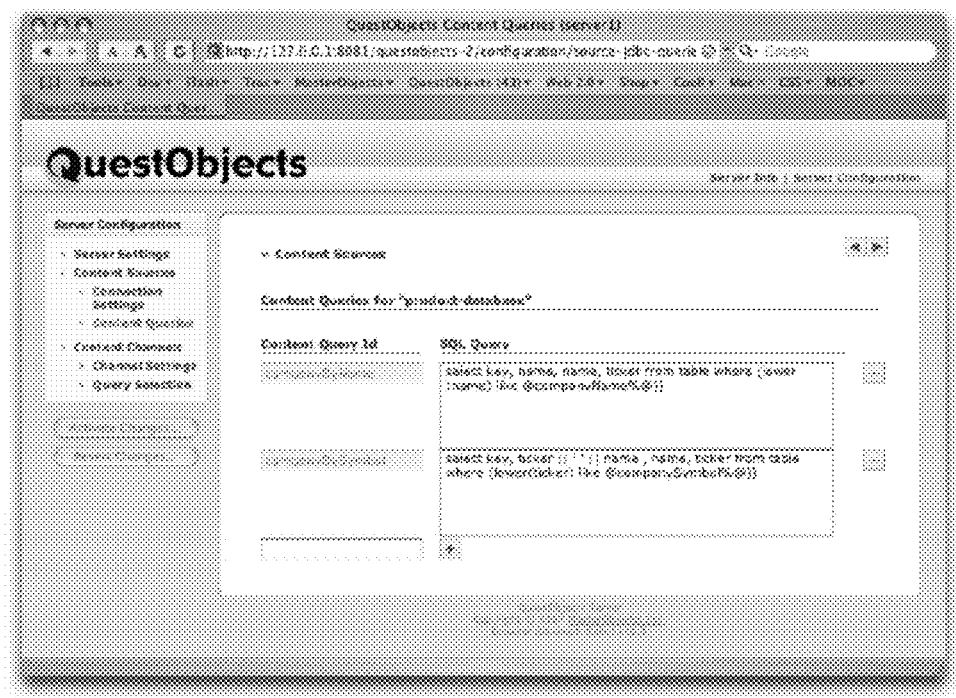

FIG. 9B shows an example screen 194 that appears after clicking on the "content queries" button for an SQL content source. In accordance with an embodiment each content query is identified by a unique Id, and contains query information in the content source's native query format: in this example, SQL. Query values (including any Quester and dependent Quester attribute values) are mapped to variable names in the content channel definition described for FIG. 10A below using the groupToVariable mapping described earlier. In content query definitions for the SQL CAM, the variable names are included as "bind variables" inside the SQL statements. The SQL dialect used depends on the underlying SQL database and is not dictated by the QuestObjects system.

Content query definitions for other types of content sources can use different yet similar ways to place content channel-defined variable values into the native content queries sent to the content source, based on the variable name defined by the groupToVariable mapping.

Figure 10A:
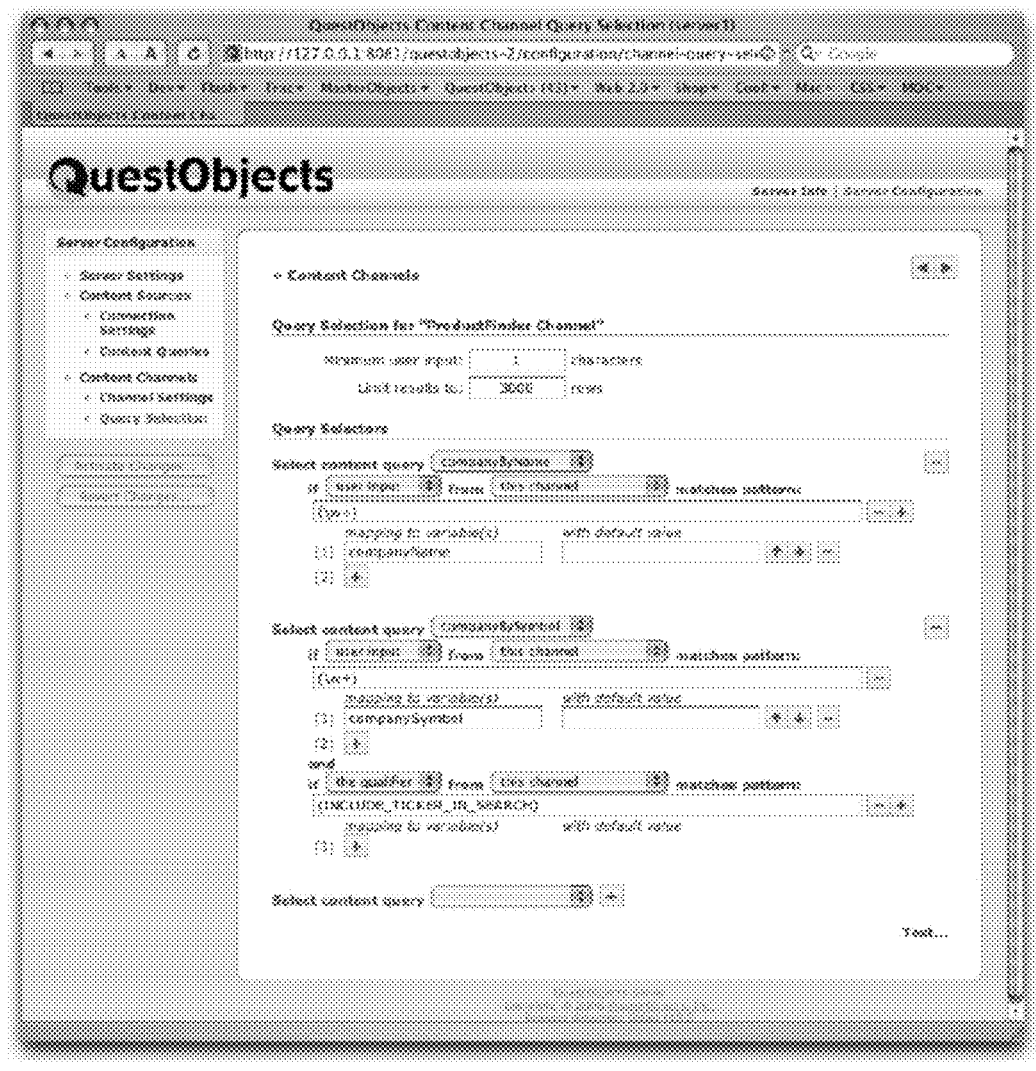

FIG. 10A and FIG. 10B show a screenshot of the configuration screen 200 for a content channel that performs zero, one, or two content queries depending on two query selectors. FIG. 10B shows an example of the XML elements 204 needed for one query selector, as it would appear in a content channel configuration file. In the content channel configuration screen in FIG. 10A, the administrator can define the minimum length of the inputBuffer that is required before any content query is fired (and thus before any results are returned to the QuestObjects client). Also, the total number of results fetched by the content channel can be limited to a specified maximum. Associated content queries can use this limit to stop fetching results after the maximum has been retrieved from the content source.

In accordance with an embodiment, a content channel contains one or more query selectors, each one linked to one of the content queries defined earlier. A content channel does not need to know about the type of content source that is queried by the content query. The content channel can therefore combine results from a potentially unlimited number of content sources. Also, by specifying multiple query selectors that select a content query from one content source, multiple consecutive (or simultaneous, if supported by the content source type and the capabilities of the associated CAM) queries can be fired against the same content source upon a single QuestObjects client action or dependency trigger. One example use for this would be looking-up persons in a database by matching the inputBuffer with both the "lastName" and the "firstName" columns in a relational database.

In accordance with some embodiments, the QuestObjects server can perform all matching queries simultaneously (i.e., the various content queries are performed at the same time, wherein the content channel merges the results once all of the content queries have returned results). In accordance with other embodiments, content queries can be performed synchronously (i.e., subsequent content queries will only be performed after the prior content queries have finished). If a content channel is configured to only return a limited (maximum) number of results, then subsequent content queries do not necessarily have to be performed. If the QuestObjects server has already received a sufficient number of results from one or more prior queries, it can skip the subsequent content queries, even if they are matched by the query selector. This behavior can be configured in the content channel.

A system administrator can define each query selector by first selecting one of the predefined content queries (contentQueryId). Then, one or more selection criteria are specified, as further described below.

For each selection criterion, the Quester attribute and the content channel name identifying the Quester are selected. This identifies the value against which the selector applies its selectionPattern. In accordance with an embodiment, the selection pattern uses standard Regular Expression syntax, as is commonly supported in various programming languages, such as provided by the java.util.regex package in the Java language. The result of applying the pattern against the value either does not return a value (in which case the content query is skipped, i.e. not performed), or it returns one or more values. These returned values are mapped to the variable names that were optionally included in the selected content query.

In the example of FIG. 10A, the content query "companyByName" is performed if the inputBuffer from the content channel itself matches the "(\w+)" pattern. This pattern returns a single variable value if the inputBuffer contains one or more non-white-space characters. So, if the QuestObjects client transmits a query containing one or more characters, then the content query "companyByName" will be performed.

The second querySelector in the screenshot example performs the content query "companyBy Symbol", but only if the Quester's qualifier holds the value "INCLUDE_TICKER_IN_SEARCH". This example is useful in applications where users can type either a company name or a ticker symbol into a QuestField to find matching results. The user can select whether companies should also be found by ticker symbol by selecting a checkbox that results in qualifier value "INCLUDE_TICKER_IN_SEARCH".

In accordance with an embodiment, a pattern match (regular expression) may return a value, but not every group identified in the pattern must necessarily return a value. For this reason, each groupToVariableMapping allows the administrator to define an optional defaultValue that will be applied against the content query instead.

In accordance with some embodiments, metadata values associated with a result are returned in a fixed order, wherein the QuestObjects client identifies individual metadata values in a result as entries in an ordered array using an index ([0], [1], etc). In this instance, the QuestObjects server does not need to send any information about the metadata back to the client, apart from the ordered metadata values themselves. In other embodiments, each metadata value that is returned by a content channel is associated with an id that is sent to the client Quester in the questerRegistered message. Once the ids of the ordered metadata values are known by the client, subsequent results (answers to queries from that client from the server) do not need to include the metadata ids. The client derives individual metadata values from the order of the ids as it was defined and received in the questerRegistered message.

Result Types

In accordance with some embodiments, results that are returned to a QuestField client have a "result type" that determines how the result is handled in the client software. Results of type "normal" are typically displayed as part of an ordered list in the user interface, and will be associated with zero or more metadata values.

Other result types do not typically return content from the content engine, so their value and key have different meaning, and the metadata also has a special meaning (or is omitted). QuestField client embodiments that support the special result types usually have additional "result layouts" that are used to display the special types of results received from the server.

Results of type "query suggestion" are typically displayed at the top of the results list, wherein the value corresponds to the suggested query (and suggesting to the user an alternate query that might return better results). Some QuestField user interface embodiments show these query suggestions in a separate popup list or tooltip. When a user selects a "query suggestion" (e.g., by clicking on it with the mouse), a QuestField embodiment can copy the value into the input element and perform that query in order to retrieve and display the associated results.

Results of type "information" can be displayed at the end of a results list, to tell the user something about the results that were returned (e.g. "Only 25 results were returned although more information might exist. To receive more results, please rephrase your query.").

Results of type "indexing" indicate that the server cannot yet return a full set of "normal" results because the underlying content source is being indexed. When the QuestObjects server returns a result of type "indexing", corresponding metadata values can indicate the percentage of the content that has already been indexed, the amount of time indexing has already taken, and the estimated time remaining.

Results of type "error" indicate that an error has occurred during the execution of a query, or possibly one of multiple queries in a content channel. Different QuestField clients can handle these results differently: for example, they might display an error line as part of the result list, or group errors into a single error message displayed to the user.

In accordance with an embodiment that uses an XML-based communications protocol, the optional type element indicates the type of the result record. It is an integer value that defaults to 500 for "normal" result records (in that case, the type element is omitted in the XML). Negative numbers are reserved for future use. The type can be used for the following purposes:

In the QuestObjects server, results from content queries performed in a content channel are merged by type, wherein lower types always precede higher types. Lower result types therefore always appear higher in the list than higher result types. Results of content queries on the server are expected to be pre-sorted on their type number and their value. If a content query does not sort results, then this must be configured on the QuestObjects server. In that case, the results will be sorted by the QuestObjects server before they are merged with the results from other content queries in the content channel.

As described above, QuestField clients can handle, display, and format results differently depending on their type. In accordance with an embodiment, the following type ranges are reserved. Built-in plain list layouts for all negative type numbers are provided as part of the system. Any third-party, customer-specific and custom list layouts do not need to handle these result types, although they may optionally override individual ranges.

Negative result type numbers:

−100 This number is reserved for errors that occur in queries performed by Content Access Modules (such as SQL and LDAP). When the content access module receives an error, a single result is returned to the client with type −100, with the following values:

key: The native error number as it was returned by the content source;

value: The native error text as it was returned by the content source;

metadata: null;

expires: Typically, the "expires" attribute for the range will contain the time that corresponds to the moment of the error: If a one-time error happens, the query will be re-executed immediately if the client requests this. If an error is tied in to the query (i.e., invalid query), then the expiration may be omitted or long so that the query will not be re-tried and the error will remain in the QuestObjects server cache. System-provided QuestField result list layouts will display an error symbol and a generic text "The query could not be executed by the content engine." to the user (in the local QuestField-configuration language), and may optionally display the value and metadata in a technical "about box" for troubleshooting purposes. Depending on the type of the error, the Content Access Module may also send an error "-499" to the QuestFields client so it goes into offline mode (see chapter 3.5).

−90 This type number is reserved for situations in which the Content Access Module cannot reach the content source, i.e. the content source is unavailable.

key: An optional CAM-specific error number;

value: An empty string, or a string that is meaningful to end users. If empty, QuestField clients will display a generic text "The content source is currently unavailable." to the user (in the local QuestField-configuration language). If the Content Access Module returns a value that is non-empty, e.g. "We are performing scheduled maintenance. The weather information server will be available again at 9AM EST.", then QuestFields append the value to the generic unavailability text;

metadata: null;

expires: This is the time at which the server is expected to be available again. QuestField clients should respect this time and wait for at least this long before retrying a connection to the server, unless some results in the result list were valid (it is possible that a content channel contains results from one content query but missed results from content queries corresponding to content sources that are unavailable). System-provided QuestField result list layouts will display the text. The QuestField client may optionally display the value and key in a technical "about box" for troubleshooting purposes. The QuestField client may also use the "expires" time to display a message "The content source is expected to be available again at xx:xx.".

−89 through −80 This type number range is reserved for "QuestObjects server temporarily busy, try again later" situations.

−86 This type number is used for situations in which the QuestObjects server is too busy to handle a request.

key: An optional number that identifies the specific reason why the server is busy;

value: An optional technical description "why" the server is busy for troubleshooting purposes, e.g. "The request queue is full.";

metadata: null;

expires: Typically, the "expires" attribute for the range will be the time that corresponds to the earliest moment at which the server suggests next doing a query. A QuestFields client should not re-query until this moment is reached. System-provided QuestField result list layouts will display a generic text "The QuestObjects Server is too busy to handle your query. Please try again later." to the user (in the local QuestField-configuration language). The QuestField client may optionally display the value and key in a technical "about box" for troubleshooting purposes.

−83 This type number is used for situations in which the content engine is busy indexing information.

key: If available: The percentage complete (0-100, integer). Otherwise: null;

value: The meaningful name of the index being created. For example, "masterobjects.com" for a Content Access Module that is indexing documents or web pages in that domain. A CAM should always return something. If no meaningful name is available, then the QuestObjects server will return the CAM instance name;

metadata: null;

expires: Typically, the "expires" attribute for the range will be the time that corresponds to the current moment so that the next query shows the current percentage, if available. If indexing has an expected end time, then "expires" should be the expected end time.

System-provided QuestField result list layouts will display a generic text "Currently being indexed: value" to the user (in the local QuestField-configuration language, with the value appended), and may optionally display a progress bar if the key is non-null.

−29 through −20 This type number range is reserved for QuestObjects server-generated "query suggestions". These results are typically stripped off the visual results list, and displayed in a separate user interface element such as plainly formatted suggestions at the top of the list or a "tooltip". Selecting a value from this result in the client causes it to become a new query.

−26 The QuestObjects server suggests a different spelling for what the user has typed (e.g., for the previous client query value/input buffer because it is not recognized as valid). The value is typically shown as a plainly formatted result in the normal list element.

key: null;

value: The improved query value;

meta0: null;

expires: Typically, no expiration applies so the "expires" attribute is omitted.

-23 The QuestObjects server suggests a related query (that is, the query word might have been correct or valid, but there are related subjects that the user might be interested in). Depending on the QuestFields client, this value is not displayed amongst the regular results, but in a tooltip or in a separate pane or tab.

key: null;
value: The related query value;
meta0: null;
expires: Typically, no expiration applies so the "expires" attribute is omitted.

−9 through 0 This type number range is reserved for plainly-formatted texts that are to be displayed in the result list. QuestFields clients use plain formatting that displays the value only, regardless of the list layout that was chosen in the client.

key: null;
value: The value to be displayed;
metadata: null;
expires: A content source may optionally return an expiration time.

Positive result type numbers

Positive type numbers typically correspond to valid results, wherein the type determines the sorting order: Lower numbers appear before higher numbers. QuestField clients will use the list layout and metadata formatting as defined by the "listLayout" attribute configured on the client.

Reserved for content results that are sorted before normal results.

Reserved for normal results.

101+ Reserved for results that are sorted after normal results.

Client Embodiments

In accordance with various embodiments, the client part of the QuestObjects system can be embedded into a variety of different web-based applications. The number of user interfaces that can take advantage of the invention is virtually unlimited. Every application that deals with incremental client-generated character input and returns matching content over a network (or locally, i.e. with client and server running on one device) can be implemented using the various embodiments of the present invention to increase performance and user-friendliness, and significantly decreasing application development cost.

Common embodiments of the invention wrap the client objects of the QuestObjects system into user elements that are referred to as "QuestFields". Many types of QuestFields are envisioned, six basic types of which are described below. These QuestField types differ in complexity, but have in common that they can enhance any web browser or handheld wireless device application that is used to enter, find, retrieve and/or manipulate information stored in remote databases.

FIG. 11 shows a table 210 that compares the six basic QuestField types. From these basic types, complex QuestFields can be derived that combine the properties of multiple QuestField types.

AutoLookup QuestField

The AutoLookup is one of the simplest types of QuestField. Upon user input (or after a dependent QuestField is modified), the QuestField does a "direct lookup" in the underlying content source where the data returned has a one-to-one relationship with the user input.

Examples include a City QuestField that automatically displays the city for a specific Zip code, a Bank Number QuestField that verifies the validity of an account number, a Translation QuestField that automatically looks up the translation of text that the user has entered, a Stock Quote QuestField that returns a stock quote for a specific ticker symbol, or a Calculator QuestField that returns the result of a specific calculation performed on the user's input.

AutoComplete QuestField (AutoSuggest QuestField)

An AutoComplete QuestField assists the user during data entry by looking up multiple possible matches directly based on the user's character-by-character input. While the user types, the "best match" for the input is autocompleted into the input field. An optional popup list can display alternate choices or suggestions to the user. The user input typically has a one-to-many relationship with the data that is returned by the content source, and the number of records returned is usually known but can be limited by the server.

Examples include a PeopleFinder QuestField that looks up persons in a directory, a Product QuestField that helps the user find products, or an Account QuestField that helps the user in finding and entering customer account numbers.

AutoSuggest QuestFields are almost identical to AutoComplete QuestFields, except that they do not provide in-field auto-completion for the currently selected result record. In some QuestField embodiments, this is simply configured by setting an "autoComplete" attribute to "false".

AutoSearch QuestField

An AutoSearch QuestField interprets the user input as a discrete search query that can be in any query format supported by the underlying search engine(s). The input is not usually autocompleted in the input field because of the nature of the input, although some AutoSearch QuestFields will suggest queries from a word-index or from a user query history list. Similar to the AutoComplete QuestField, search results are immediately displayed in a formatted popup list. The number of results returned from the server is typically unknown and limited by the search engine. Results in the AutoSearch QuestField popup list are usually filtered and ranked before they are displayed.

Examples include a Site Search QuestField that enables users to find pages on a website based on full text Boolean searches, or a Document Search QuestField that allows users to retrieve documents or files based on full text as well as other criteria. A publishing company, for example, can use AutoSearch QuestFields to allow users to quickly and efficiently search newspaper and magazine archives.

Relational QuestField

A Relational QuestField provides a complex user interface comprising multiple entry fields adapted for a specific use. A Relational QuestField simultaneously accesses multiple content channels and allows users to enter multiple values or click on results to "navigate" through relational content. Relational QuestFields provide a sophisticated user interface that typically feels like a "browser" or "navigator" because it can use multiple columns, tree lists, or even three-dimensional ways to display the results.

Examples include an Address QuestField that can be used to enter full addresses (street, city, state, zip, etc), a Thesaurus QuestField that allows users to navigate through taxonomy of terms, and a File Browser QuestField that behaves similar to, for example, Microsoft Windows Explorer or the Apple Mac OS Finder, yet operates on remote file structures. Relational QuestField embodiments are also ideally suited in multi-media library software and "jukebox software" such as, for example, Apple iTunes or Microsoft Media Player, where the content and library reside on a remote server. The same is true for music stores and other ecommerce sites in which Relational QuestFields provide a greatly improved way to navigate the remotes databases over the prior art.

FreeForm QuestField

A FreeForm QuestField is a text area that allows users to enter blocks of text of any size. Rather than treating the entire input as a query, a FreeForm QuestField intelligently interprets the user input as it is typed, providing the user with wide range of "on the fly" text editing enhancements.

Examples include a SpellCheck QuestField that checks and corrects the user's spelling or grammar based on remote dictionaries while the user is typing, or an AutoSave QuestField that automatically creates a server-side backup while the text is being entered.

Background QuestField

A Background QuestField does not have its own user interface. Instead, it is a QuestField that can be invoked to run in the background of an application, invisibly accessing a QuestObjects service. For example, a Background QuestField could be a real-time stock price lookup function available to stored procedures in a relational database.

Figure 12A:
FIG. 12A and FIG. 12B show two screenshots of web pages that incorporate client objects in accordance with an embodiment.
Figure 12B:
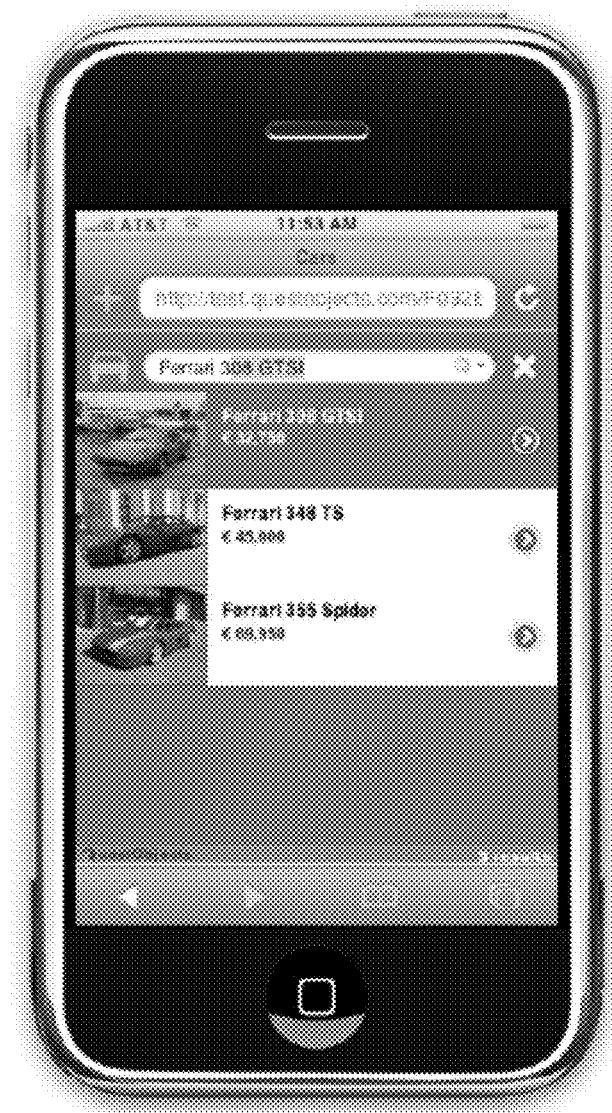

FIG. 12A and FIG. 12B show two examples of Internet applications based on HTML pages containing an AutoComplete QuestField. In particular, FIG. 12A shows a web page 220 loaded into a Microsoft Internet Explorer browser application running on a Windows XP operating system, wherein the user has placed the cursor into a QuestField that is used for searching second-hand cars. As the user starts typing, matching information appears nearly instantaneously, as shown in FIG. 13D.

FIG. 12B shows a similar application 224 optimized for the small screen format of a mobile phone or portable device (for example, an Apple iPhone or another type of phone device), as it looks after the user enters "Ferrari 3" using the phone's on-screen keyboard and then dismissing the keyboard. During keyboard entry, the vertical area occupied by the QuestField's result list is minimized. The bottom of the result list in an AutoComplete QuestField displays the number of available records, even while the user is typing. When the phone is rotated into "landscape view", using JavaScript functions and the "onresize" handler, the QuestField can adopt itself to the new screen width and screen height.

QuestFields are especially suited to enhance finding information on small wireless devices such as cell phones and PDAs. The QuestObjects protocol (QOP) minimizes network traffic and maximizes the speed at which users receive feedback upon their input. Therefore, perceived performance is excellent even when using slow network connections such as GPRS.

Figure 13A:
FIG. 13A, FIG. 13B, FIG. 13C, FIG. 13D, FIG. 13E, FIG. 13F, FIG. 13G, FIG. 13H, FIG. 13I, and FIG. 13J show various states of a basic input element used on the client part of an embodiment.
Figure 13B:
Figure 13C:
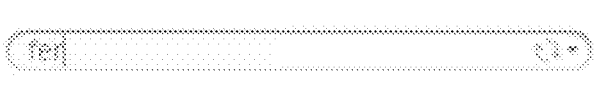
Figure 13D:
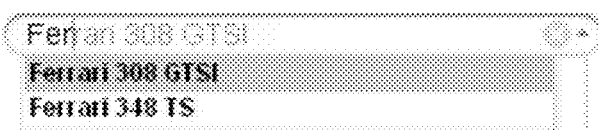

FIG. 13A, FIG. 13B, FIG. 13C, FIG. 13D, FIG. 13E, FIG. 13F, FIG. 13G, FIG. 13H, FIG. 13I, FIG. 13J show various states 230 of the basic input element that plays a part in many QuestObjects client (QuestField) embodiments. FIG. 13A shows the input element before the user has typed any characters. For branding reasons, and to remind users that the input field is dynamic rather than static as was the case in the prior art, some QuestField embodiments can display a watermark, such as a QuestObjects "Q" symbol or trademark, or other symbol, inside of the input area.

At the stage represented in FIG. 13A, in accordance with most embodiments, the QuestFields will not have yet connected to the QuestObjects server (i.e., it will not yet have established a session with the server). However, if the QuestField has an initial (typically, pre-configured by the application or website designer) query (such as an inputBuffer value, a qualifier value, or a value held in a dependent Quester), then the QuestField can automatically connect to the server as shown in FIG. 13B. If the QuestField does not have an initial value, then it can connect to the QuestObjects server upon the first user action (such as typing a character). The first character typed does not necessarily fire a query (i.e., the client Quester does not necessarily send a query message to the server after typing a single character). The number of characters that must be typed before a query is submitted is implementation-configurable. This is to further minimize the load on the server, and to avoid performing unnecessary or less useful queries, as often is the case if the user only types a single character.

During the connection phase, a session is established. This can be indicated by an animated communication symbol inside of the QuestField (or, in some embodiments, elsewhere on the screen, such as in the header, margin, or footer of the window containing the QuestField). Of course, this symbol generally does not appear if a different QuestField has already established a session with the server through the central client Controller.

FIG. 13C shows the state of an AutoComplete QuestField embodiment configured to access a "Second Hand Cars" content channel after a user has typed three characters ("Fer"). A rotating user interface element indicates that a query is being performed (in this case, it has the shape of two arrow symbols that rotate in a circle). For a brief time after the user types the characters, this user element may appear static (i.e., non-rotating). This is because a QuestField reduces network traffic and server load by accumulating user input for a configurable amount of time. To improve the user feedback even further, the (initially static) user interface element can appear subtly by zooming into view, or by fading into view (say, from 100% transparent to opaque).

FIG. 13D shows the same QuestField after it has received results from the QuestObjects server. The corresponding drop-down list can be configured to open (appear) automatically after results are found. In some implementations, this behavior can also be switched off by the user.

Figure 13E:
Figures 18A, 18B, 18C:
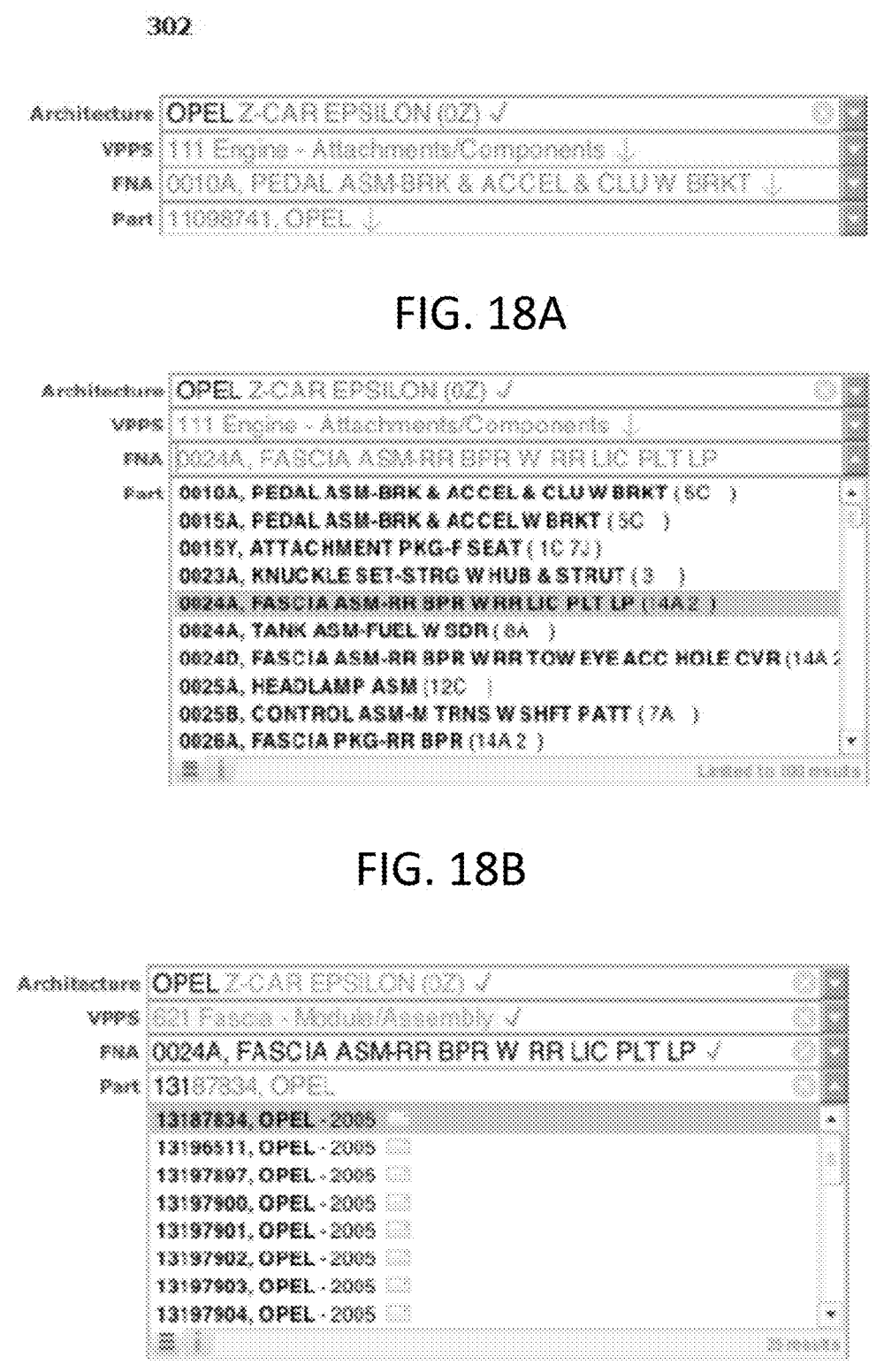

A QuestField can be configured to provide in-field "auto-completion", using various text colors to indicate whether a single unique record was found (in which case a checkmark may appear after the input, as shown in FIG. 18A) or whether more records are available (as is the case in FIG. 13D). If the user closes the drop-down list, or in other situations, configurations, or applications where no results list is displayed, arrows inside of the QuestField can indicate whether previous and/or next results are available, allowing the user to select the previous and next results using the Up and Down arrow keys on the keyboard, as shown in FIG. 13E.

As a user types new text, it typically appears in a lighter-than-usual color (e.g., gray instead of black) until at least one matching result is received from the server. This ensures that the user can always recognize whether the current value in the input field was accepted or not.

Figure 13F:

When this QuestField embodiment encounters a non-recoverable error, it displays a "red triangle" as shown in FIG. 13F. The QuestField remains disabled until the web page is reloaded. Non-recoverable errors usually indicate a faulty configuration of the QuestField in the web page, such as a wrong server URL or a non-existent QuestObjects content channel id. Clicking on the triangle symbol reveals an "information pane" in the user interface that displays information about the error, such as the error number and a descriptive text.

Figure 13G:

When the QuestField embodiment encounters a recoverable error, it displays a Pause symbol at the right of the entry field as shown in FIG. 13G. The field was placed in off-line mode, so that it temporarily behaves like it is disabled. To reduce server load in error situations, no more communication with the QuestObjects server will take place until the web page is reloaded, or until the user clicks on the Pause symbol to reconnect. During off-line mode, the information pane shows an error message.

Figure 13H:
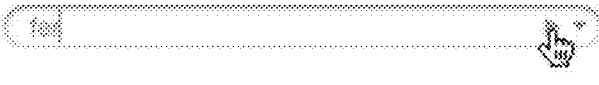
Figure 13:
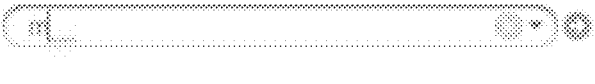

As shown in FIG. 13H, in accordance with an embodiment the Pause symbol changes to a Play symbol when the user holds the mouse over it, allowing the user to retry the action that just went wrong. If the error occurs again, the QuestField will re-enter off-line mode and display the Pause symbol again. In some embodiments, the pause/play metaphor can be substituted by a simple yellow "warning triangle", with a warning text and a button that the user can click to try and re-establish a session.

A content channel can postpone a query (coalesce the input) until at least a certain number of characters is entered into the client Quester. Some QuestField embodiments may indicate this to the user by displaying an underline symbol that stretches in front of the characters typed, as shown in FIG. 13I. The length of this underline is calculated to match the number of missing characters, which is configurable by the application designer.

Figure 13J:

If a QuestField query does not return any matching results, then in some QuestField embodiments the system draws a "red wiggly underline" under the input, indicating that the input is invalid (or perhaps, in some applications, misspelled). This is shown in FIG. 13J. This provides an indication to the user that he or she can backspace or clear the field to try a different query, and saves the user aggravation and time compared to techniques that otherwise rely on the request-response loop to display a page that said "No results found, please try again".

Certain QuestField embodiments may display an "erase" symbol after the input element contains data (in this case, typed or pasted text). Users can click this symbol (shown in FIG. 13D, FIG. 13E, FIG. 13I, and FIG. 13J) to erase the entry field and to place the cursor at the beginning so that a new character can be typed.

Some QuestField embodiments allow the user to de-activate the dynamic lookup and autocomplete behavior. After a user disables the QuestField, a grayed-out "power symbol" is displayed in place of the various other state elements. When a QuestField is disabled, it will no longer communicate with the QuestObjects server. A disabled QuestField effectively functions like a regular entry field. To re-enable the field, the user can click the Power symbol or check the appropriate checkbox in the information pane.

All of the basic QuestField states and behaviors described above are also used in more complex QuestObjects client embodiments, examples of which are described below.

Figures 14A, 14B:
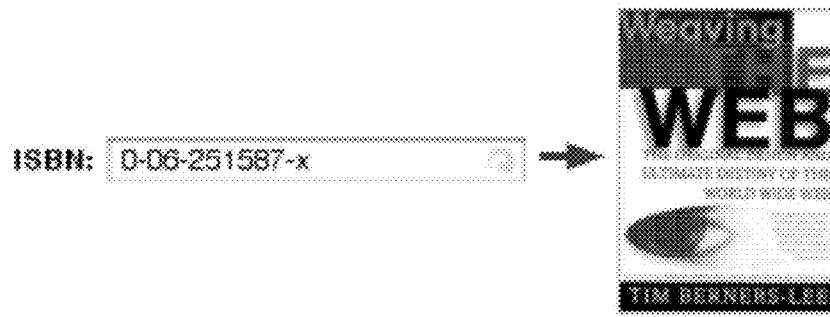
Figure 14C:
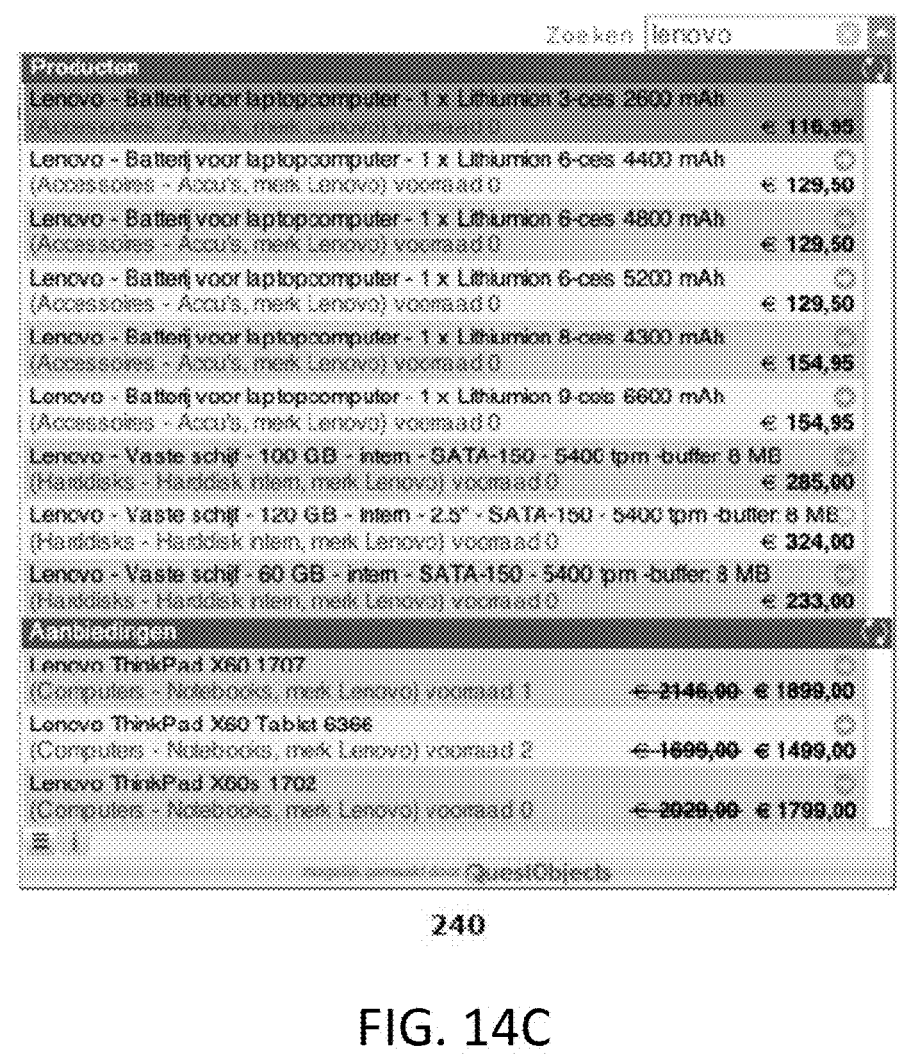

FIG. 14A, FIG. 14B and FIG. 14C show two QuestFields that implement Quester dependencies. The QuestField 234 in FIG. 14A comprises two AutoLookup QuestFields, one of which is used to check the accuracy of an ISBN number typed by a user. The second QuestField, upon reception of the appropriate key by the first QuestField, will immediately display an image of the corresponding book after its content channel returns the matching image URL for that key.

FIG. 14B shows a Relational QuestField embodiment 238 derived from two AutoSuggest QuestFields that both depend on the same input buffer. As the user types an entry into the input element at the top of this "ProductFinder" QuestField, the top QuestField displays matching products ("270 Producten", Dutch for "270 Products") and the bottom Quest-Field displays matching special offers ("3 Aanbiedingen", Dutch for "3 Special Offers").

As described previously, a client Quester does not always receive an entire result set from the QuestObjects server. Additionally, the QuestObjects server does not necessarily receive the entire available result set from the content source(s). In such cases, the client Quester may receive partial results as they "trickle in" from the server. This is typically envisioned to the user by rotating user interface elements next to (or below) the corresponding result lists 240, as is shown in FIG. 14C. Rather than saying "270 Producten" and "3 Aanbiedingen", this screenshot shows that the QuestField can omit the number of results (which in this case is still unavailable for both Questers) and display a set of rotating arrows next to each content channel name. QuestField result lists can be customized to virtually any "look and feel", using various techniques including CSS, Adobe Flash, or any other technology available on the QuestObjects client embodiment. Instead of "special offers", a dependent QuestField can just as easily display matching advertisements implemented using any means available to the browser. QuestFields are therefore ideally suited for advertising-driven information publishing, where they provide a much better means for user-targeted advertising than the prior art that relied on advertising updates only after the entire page was reloaded.

A QuestField can also display advertising or sponsoring information in its margins or footer, as is the case in FIG. 14B and FIG. 14C, where the QuestObjects logo and a "powered by QuestObjects" text can be received from the server, and could be the result of a content channel that returns multiple items or texts to be displayed at the footer, in some envisioned embodiments as a "slide show" or as a "scrolling ticker tape", as "vertically scrolling credits", or a combination of these. In the example shown, the text returned ("mogelijk gemaakt door") is in the Dutch language. A content channel is capable of returning the appropriate data by using the language identifier as a qualifier in the query.

Figure 15A:
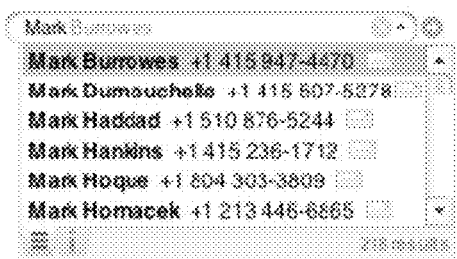
FIG. 15A, FIG. 15B, FIG. 15C and FIG. 15D show illustrations of various client user interface elements styled for various end user applications in accordance with an embodiment.
Figure 15B:
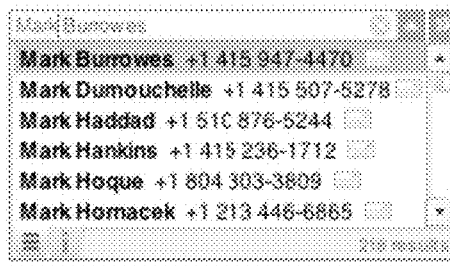
Figure 15C:

FIG. 15A, FIG. 15B and FIG. 15C show various examples of visual QuestField styling and custom result list layouts. FIG. 15A shows an AutoComplete QuestField 244 that is used in an embodiment referred to as "PeopleFinder". The results list displays names in bold, phone numbers in regular font, and an email symbol allowing users to quickly send an email to the corresponding person.

FIG. 15B shows the same QuestField 246 using a different CSS style sheet. This style sheet (reconfigured by changing a "skinName" property) uses non-rounded borders, orange color, and different-looking drop-down and submits button symbols, and different colors for typed and auto-completed text. Different QuestField embodiments can also auto-detect the local operating system and adjust their look and feel so they match the native look of each user's system (e.g., using "Aqua" widgets on an Apple Mac OS, or using "Aero" widgets on a Microsoft Windows Vista OS).

FIG. 15C shows an AutoComplete QuestField 248 that uses another CSS style sheet (this time, using a dark gray color for the drop-down button) and a customized list layout spanning multiple lines per result, a "lock symbol" that appears for each result depending on a metadata value received from the QuestObjects server, and an additional HTML-formatted footer below the QuestField result list.

Figure 15D:
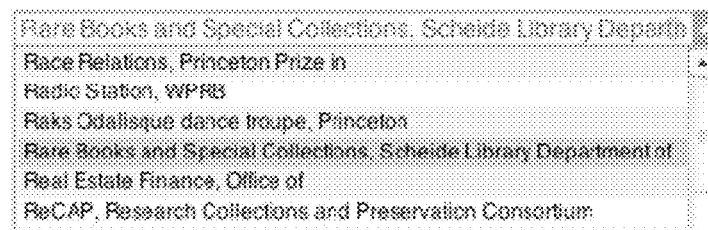

FIG. 15D shows an AutoComplete QuestField 250 with a list layout optimized for finding websites from a server-stored index of web site titles.

Figure 16A:
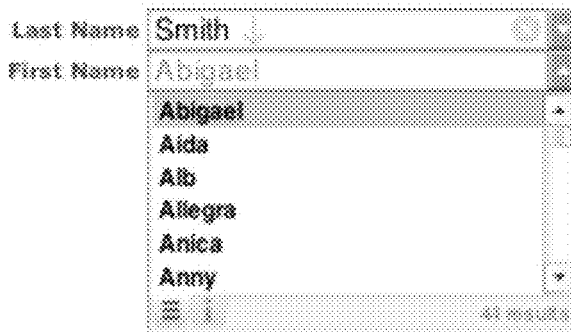
FIG. 16A, FIG. 16B and FIG. 16C show illustrations of client user interface elements that use two content channels to provide immediate user feedback upon user input in accordance with an embodiment.
Figure 16B:
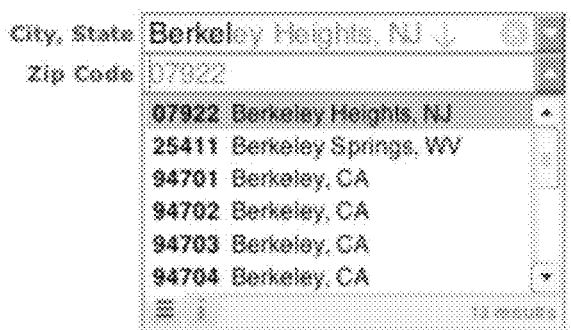
Figure 16C:
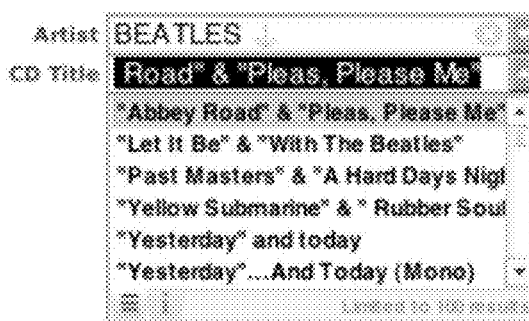

FIG. 16A, FIG. 16B and FIG. 16C show different embodiments of the AutoComplete QuestFields that are combined in the client application to provide dual lookup capabilities to the user. In particular, FIG. 16A shows two QuestFields 252 with dependencies to allow users to type either (part of) a last name, first name, or both to find persons in a directory. As last name information is entered into one QuestField, the other QuestField automatically displays a list of all matching first names that exist in the directory. FIG. 16B shows a similar example 264 of two dependent AutoComplete QuestFields, in this case using "City, State" and "Zip Code" to allow users to quickly enter or find the proper matching data records. FIG. 16C shows a similar example 266 of two dependent AutoComplete QuestFields, in this case using "Artist" and "CD Title" to allow users to quickly enter or find the proper matching data records.

Figure 17A:
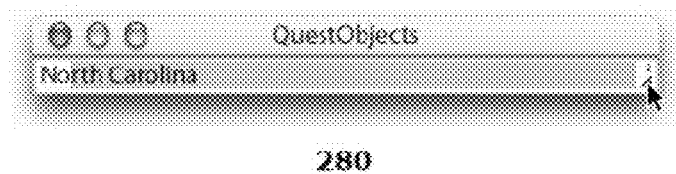
FIG. 17A, FIG. 17B, FIG. 17C, FIG. 17D, FIG. 17E and FIG. 17F show screenshots of various states of a complex user interface that uses various client user interface elements in accordance with an embodiment.
Figure 17B:
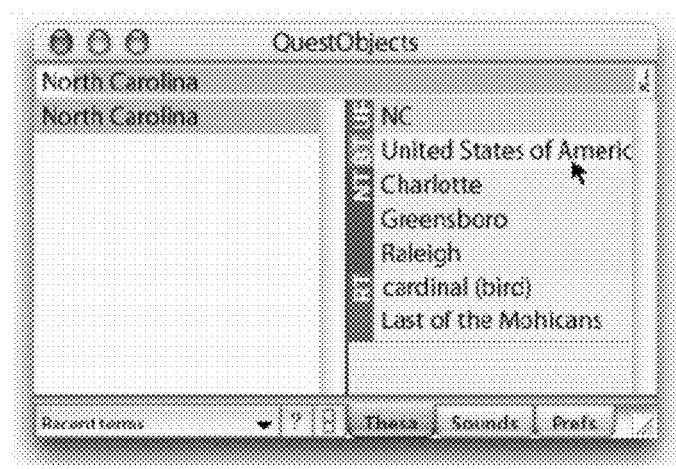

FIG. 17A, FIG. 17B, FIG. 17C, FIG. 17D, FIG. 17E, FIG. 17F show an embodiment 280 in which various states of a complex Relational QuestField user interface design that is used to navigate a large thesaurus database. After the user types "No" into the input field and clicking on the triangle as shown in FIG. 17A, a two-paned user interface 284 appears (FIG. 17B). The left column shows lookup results similar to the AutoComplete and AutoSuggest examples shown earlier. The right column shows four dependent result lists corresponding to four Questers that retrieve dependent data on the currently selected result on the left. With "North Carolina" selected, the "UF" list displays all "used for" terms from the thesaurus. The "BT" list displays all "broader terms" from the thesaurus. The "NT" list displays all "narrower terms" from the thesaurus. And the "RT" list displays all "related terms" from the thesaurus.

Figure 17C:
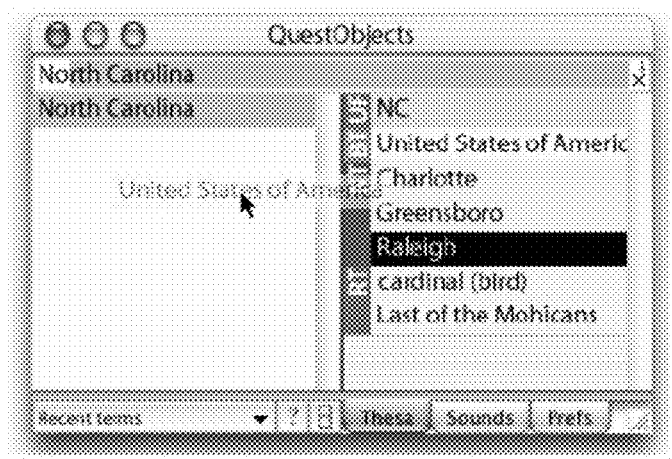
Figure 17D:

FIG. 17C shows a screen shot 288 of the state of the user interface after the user "drags" the result "United States of America" from the right-side list into the list on the left. Once the entry is dropped in place (as shown 292 in FIG. 17D), all Questers that depend on the "currently selected term" immediately retrieve new matching values from the QuestObjects server. It will be evident to those skilled in the art that users are often likely to click on previously visited records, such as re-clicking on term "North Carolina" in FIG. 17B. The embodiments described herein make this process efficient and quick, even if the content source (in this case, thesaurus database) contains a huge number of records, if the user is accessing the QuestObjects server remotely, when the speed of the network is slow, and when the thesaurus is being accessed by many simultaneous users.

Figure 17E:
Figure 17F:

FIG. 17E shows that the user can drag 296 the term "Alaska" to the input field, replacing the previous value of the input buffer, "North Carolina". Immediately, the dependent QuestFields look up the corresponding matches. In this example, while the user selects the "Sounds" tab in the user interface 298 (FIG. 17F), another dependent Quester will perform a lookup for all states that "sound like" the currently selected term.

FIG. 18A, FIG. 18B and FIG. 18C show three screenshots 302 of an application that combines four dependent QuestFields to find car parts in an SQL database, using four indexed database columns "Architecture", "VPPS", "FNA", and "Part".

As shown in FIG. 18A, upon entering "OPEL" into the Architecture QuestField, it is automatically completed (the check mark signifies that one unique match exists). The other three QuestFields have automatically performed their dependent queries and have come up with result lists, as indicated by the green "down arrow" symbols and the auto-completed "first available" matches. FIG. 18B shows how the user can select one of the resulting FNA codes by simply selecting it from the corresponding QuestField's results list. Then, after only typing three digits of the part number in FIG. 18C, only one unique VPPS code remains, and the number of available parts, out of a potential total database size of millions, is easily found and entered. Multi dependent QuestField applications such as the embodiment shown here can replace complex multi-HTML page applications, and offer a paradigm shift for the entry, search, and retrieval of remote data.

Although in this user interface design the dependent QuestFields are arranged vertically, those skilled in the art will understand that different embodiments may position them in any order, or even place them inside of other complex user interface elements such as tabbed pages, complex grids, etc.

Figures 19A, 19B, 19C:
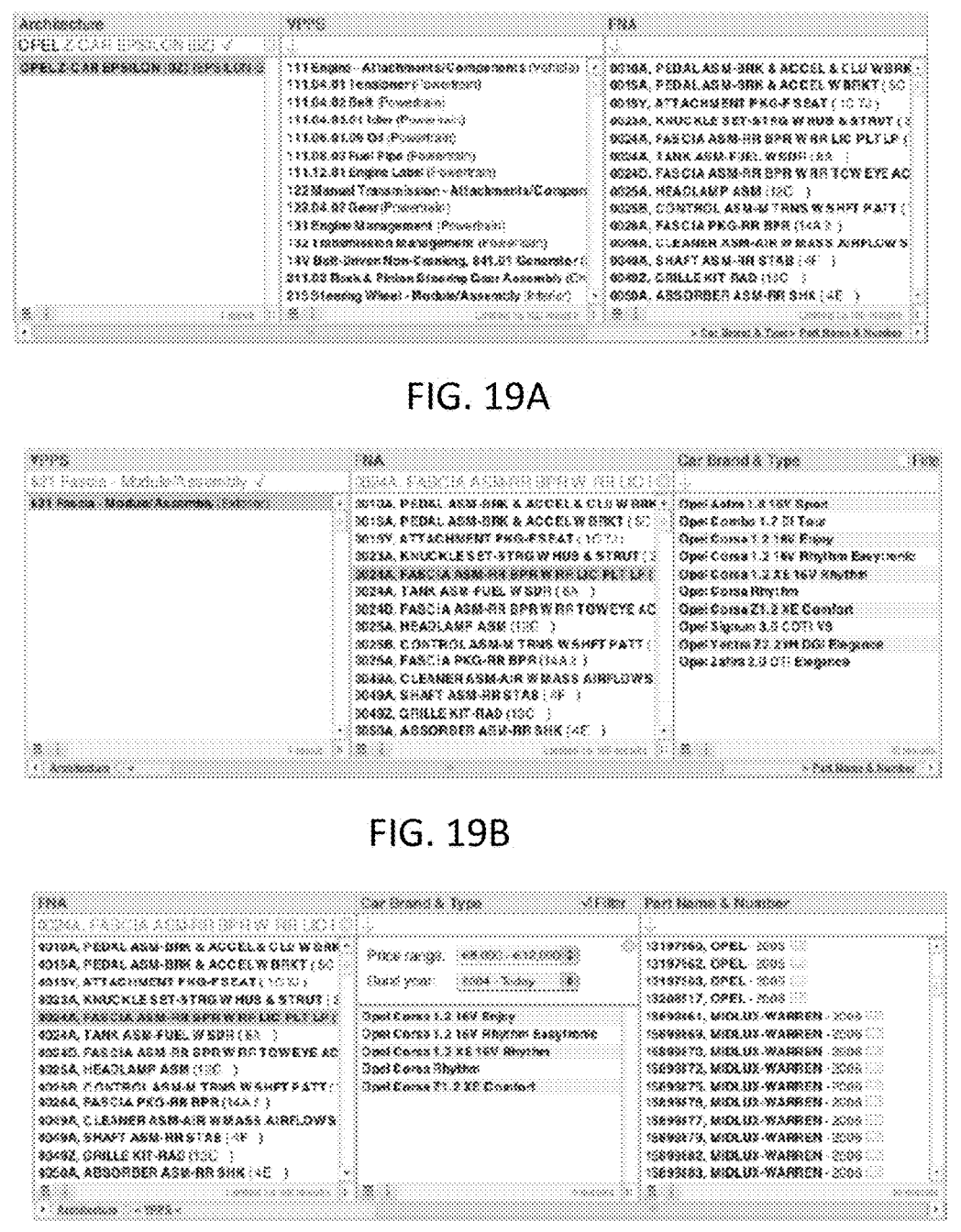

FIG. 19A, FIG. 19B and FIG. 19C show three user interface designs 310 that further illustrate the power of dependent QuestFields. In accordance with an embodiment, the four dependent Questers and the content channels used by the four AutoComplete QuestFields used in FIG. 18 can be supplemented by a fifth dependent Quester accessing a content channel "Car Brand & Type", a sixth Quester used to filter on "Price Range", and a seventh Quester to filter on "Build Year". A single complex Relational QuestField is created that offers an easy-to-use, multi-column interactive search and retrieval interface.

FIG. 19A shows a Relational QuestField that uses multiple columns, each column comprising an input field and a result list. The first three columns are currently visible, but additional columns exist to the right, as is indicated by the scroll bar element at the bottom of the QuestField, and the "Car Brand & Type" and "Part Name & Number" links. Users can use the scroll bar to reveal the columns to the right, or they can simply click on the links at the bottom to jump to a specific column. Although in this user interface design these "column links" are displayed inside of the scrollbar at the bottom, those skilled in the art will understand that different embodiments may place the scrollbar at the top and may display the links as more traditional "bread crumbs" towards the top of the screen.

FIG. 19B shows the state of the user interface after the user has clicked on "Car Brand & Type" in FIG. 19A, or after scrolling to the right. A new column "Car Brand & Type" appeared, and the left "Architecture" column has disappeared from view. In its place, a new "Architecture" link is displayed on the left side of the scroll bar. Clicking on this link will scroll the QuestField back to the left. Note that, in this example, the user has already typed "OPEL", causing the Architecture content channel to perform a query that returned one record, "OPEL Z-CAR EPSILON . . . ". This has already caused all of the dependent Quester content channels to re-query their content channel, filtering the number of results displayed in the result lists on the right.

Since in the above example the user has created a query in the Architecture Quester, its "erase button symbol" has appeared in the corresponding input field in FIG. 19A. Because the input field is scrolled out of view in FIG. 19B and in FIG. 19C, the erase button symbol is displayed next to the "Architecture" column link in the scrollbar at the bottom.

In the top right hand corner of FIG. 19B, note the "Filter" checkbox that has appeared for the "Car Brand & Type" Quester. This shows that any column can have one or more additional "filter channels" that a user can activate to further narrow down the search. In FIG. 19C, the QuestField is scrolled all the way to the right, and the "Filter" checkbox for the "Car Brand & Type" column is checked. These causes the additional QuestFields "Price range" and "Build year" to appear. Note that such dependent user interface elements may be hard-coded in the QuestField. However, the QuestField can also determine dynamically which additional "Filter" QuestFields are to be displayed. To this end, the QuestObjects server returns a list of available "Filter" content channels to the client Quester as part of its questerRegistered message. In one embodiment, the content channel definition on the QuestObjects server has an additional Boolean flag in the querySelector that indicates whether the dependent query definition is to be used as a filter. By clicking on the "erase button symbol" that appears next to the filter Questers, all filters can be reset to their default state. Also, by removing the checkmark from the "Filter" checkbox, the filter Questers are cleared and hidden from view.

An advantage of the dependent QuestField and Relational QuestField embodiments described above, is that users can start their search or "find process" by entering search values and making selections in any of the dependent Questers, and in any order. For example, if a user already knows (part of) a product or component number, then he or she can enter it immediately. This provides an advantage over prior art systems that typically offered a "top-down" approach to finding information. In many contemporary ecommerce sites, it is still very difficult to find a specific product, unless the user knows the exact name or the exact (and full!) corresponding part or product number. With Relational QuestFields, this is no longer necessary.

FIG. 20A, FIG. 20B, FIG. 20C and FIG. 21A, 21B, and 21C show screen shots 322-334 of two AutoSearch QuestField embodiments. AutoSearch QuestFields typically have an additional user interface element that allows users to make search selections and to view "recent queries". Contrary to the AutoComplete QuestFields and AutoSuggest QuestFields described in the previous examples, the results received from the content sources (typically, from third-party or open-source search engines) are generally not alphabetically sorted. Instead, the content source typically ranks results according to relevance. In accordance with an embodiment the QuestObjects content channel can optionally merge results received from multiple content queries. Rather than doing this by alphabet, this can be performed using the rank held in a specified metadata entry.

Figure 20A:
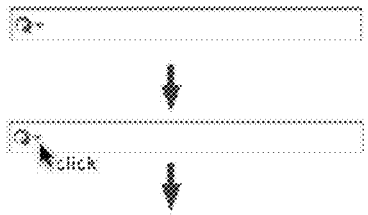
FIG. 20A, FIG. 20B and FIG. 20C show illustrations of the various states of a user interface used to perform multiple lookups in accordance with an embodiment.
Figure 20B:
Figure 21A:
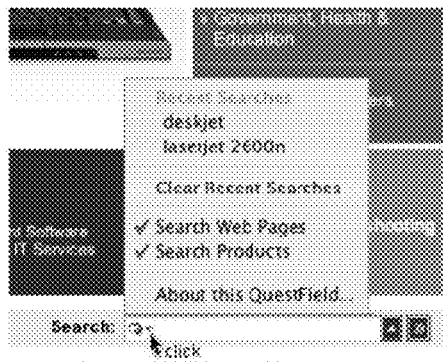
FIG. 21A, FIG. 21B, and FIG. 21C show illustrations of the various states of a user interface used to perform multiple lookups in accordance with an embodiment.

FIG. 20A, FIG. 20B, and FIG. 21A show that users can click the QuestObjects symbol in an AutoSearch QuestField to reveal a popup menu that shows recent searches (which can be re-performed by simply clicking on them), a "Clear Recent Searches" option, and optional qualifiers that enable the user to determine the content queries that are performed by the associated content channel. The "About this QuestField" menu option opens the information pane, just like the "i" tab button does at the bottom of most QuestField result list embodiments, and just like what happens when the user clicks on the regular (i.e., non popup menu) "Q" watermark that appears when a QuestField loads (as shown in FIG. 13A).

Figure 21B:
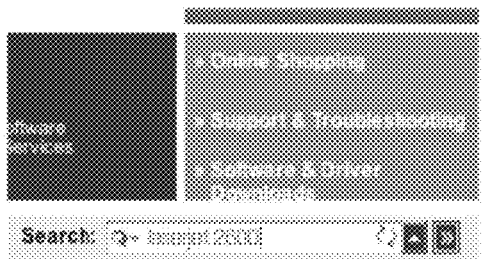
Figure 21C:
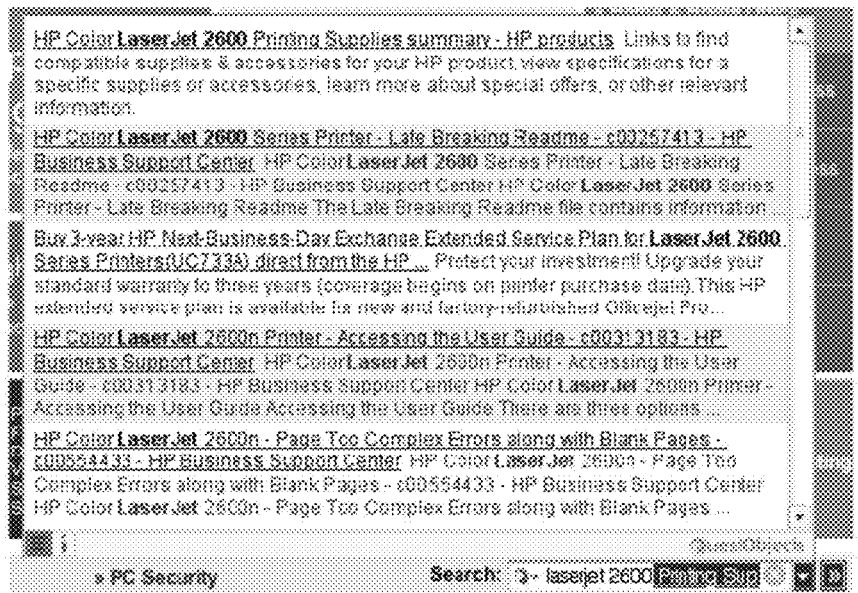

FIG. 20B and FIG. 21B show the state of the AutoSearch QuestField after the user has typed a search query. As with other QuestField types, a rotating symbol indicates that the search is being performed. Note that most search engines allow users to include search operators in their query, such as Boolean operators including "and" or "or", as is shown in FIG. 20B. The QuestObjects system simply passes the input string to the content source (in this case, search engine), but the QuestObjects client may perform highlighting and special handling of reserved words used as search operators.

The input field of an AutoSearch QuestField does not typically perform in-field auto-completion on the search results. However, the input field can optionally provide auto-completion or suggestions for the last typed word. This requires the use of a second content channel that is defined to query the full-text index that is also used by the search engine of the content source. Although not shown in FIG. 20 and FIG. 21, the corresponding auto-complete suggestions are displayed similar to URL-suggestions given in web browsers and similar to the way in which a FreeForm QuestField embodiment pops up spelling suggestions as shown in FIG. 22B. The content channel used for such "search suggestions" typically filter "stop words" and search operators (such as "and" and "or") before returning results, so that an AutoSearch QuestField only provides suggestions for the actual search terms typed by the user, not for the operators such as "and" and "or".

Figure 20C:
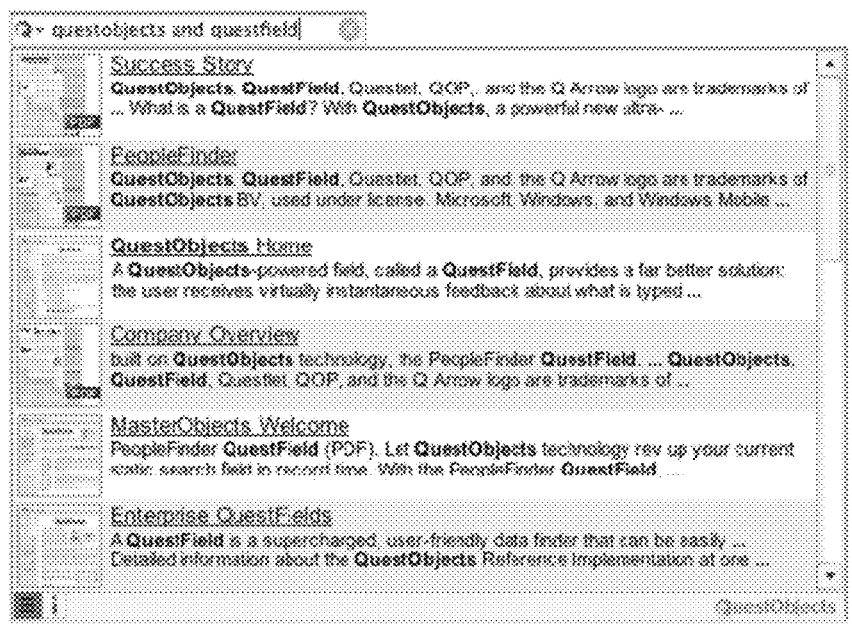

As is shown in FIG. 20C, a QuestField result list may display images that correspond to the search results. The QuestObjects server typically returns URLs to these images to the QuestField as metadata strings in the result set. These URLs can be absolute URIs to the images or other related content, or can also be file names or paths to images relative to a base URL known to the QuestField client software. By including only the path or file names, the size of communication packages received from the server is limited, and the QuestObjects server cache will occupy less memory. A content source may also provide limited HTML, formatting, "escaping", or "tagging" of search words inside of each result text. A customized result list layout can apply formatting to highlight those words to the user. In FIG. 20C and in FIG. 21C, occurrences of the search term(s) in each result are displayed using bold font formatting.

Figure 22A:
FIG. 22A, FIG. 22B, and FIG. 22C, FIG. 22D and FIG. 22E show illustrations of a text input element implementing a client object to provide user feedback in accordance with an embodiment.
Figure 22B:

FIG. 22A, FIG. 22B, FIG. 22C, FIG. 22D, FIG. 22E show an embodiment 340 in which a FreeForm QuestField is used to provide on-the-fly spell checking and lookups based on a content source containing a server-based dictionary. FIG. 22A shows a text field containing multiple lines of text ending in the misspelled word "servre". Upon a right click, the QuestField provides spelling suggestion based on the result of a content query that is performed by the "dictionary" content channel associated with the QuestField. As shown in FIG. 22A, the QuestField can indicate that the query is being performed using a rotating symbol in the popup menu that appears in the user interface. In low load situations, the QuestField can display the suggestions immediately since they will have already been received from the QuestObjects server before the user has had a chance to right-click on the misspelled word. FIG. 22B shows how the spelling suggestions are presented to the user. It will be evident to those skilled in the art that such a popup menu or context menu may contain additional menu lines revealing additional application and/or QuestField options that are relevant for the current application context.

Figure 22C:
Figure 22D:
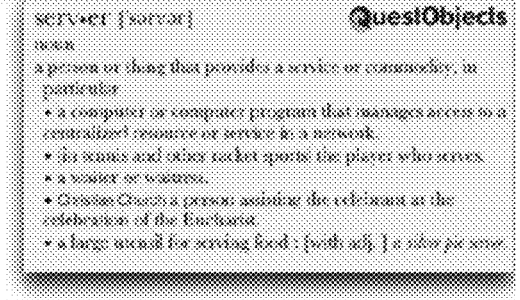

FIG. 22C and FIG. 22D illustrate how the system responds when the user right-clicks on a word that is spelled correctly. In this instance, the FreeForm QuestField looks up the word in the server-side dictionary, and quickly displays the corresponding dictionary information while the user is either pressing the mouse button or after a single right-click.

Figure 22E:
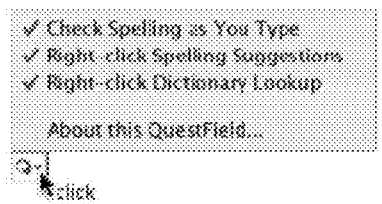

FIG. 22E shows one way in which the FreeForm QuestField can be configured. In accordance with some embodiments, a "QuestObjects Q symbol" button is included in the margin or footer of the QuestField or in the window containing the QuestField. The user can click this "button" to reveal options relating to the QuestField. In this example, the user can enable and disable three different options. Those skilled in the art will recognize that FreeForm QuestFields are capable of additional functions that enhance entry of free-form text. For example, it is possible to "push" context-sensitive pop-ups to the QuestField that are displayed automatically as the user is entering information. These pop-ups might provide suggestions, show advertising, provide links to related information, etc.

Some devices, such as the Sony Playstation 3 (PS3), or early versions of the Apple iPhone, have limited keyboard input methods that do not allow input fields on web pages to intercept or "catch" individual keystrokes entered by the user. These devices do not call the "onKeyDown" or "onKeyUp" event handlers behind input fields, because keyboard entry is instead taken over by a separate "virtual keyboard" that appears on-screen, allows a user to enter a string, and then only calls the underlying web page and input field after the entire string was edited. On these types of devices, a QuestField can intercept the click (or finger press) on the input field by overlaying a transparent "button". Instead of the regular built-in keyboard or virtual keyboard of these devices, the QuestField can open its own virtual keyboard in a separate HTML layer or in a separate HTML window. This virtual keyboard has a button corresponding to every key, as well as function keys such as backspace and a "dismiss" button that hides the virtual keyboard layer or closes the keyboard window. While the user clicks each button on the QuestField's virtual keyboard to enter incremental characters, the "click" event on each virtual key is handled so that the corresponding character is appended to or inserted into the HTML input field. From the perspective of the user, the QuestField's "popup keyboard" replaces the built-in key input mechanism, allowing the QuestField to respond to individual keys (incremental key input) rather than only responding after the user has finished entering the string. So even in those devices that do not typically allow trapping keystrokes, users can input strings using consecutive character input or using consecutive clicks (or finger presses or stylus taps), while the QuestField performs incremental queries, asynchronously receives results from the server, and displays matching results to the user as the string is being edited by the user using the virtual keyboard.

Character Input Throttling

In accordance with an embodiment, the system can be configured to more readily manage requests, retrieve and optionally cache content, and send back to the client object only the information that is needed by the user at any time. An efficient network protocol between the client and the server can be used to exchange the information in an efficient manner, to maximize responsiveness of the system to the user, while minimizing the load on content sources and to minimize network traffic. In addition to these critical parts of the system, additional functions can be implemented in the client software, as to minimize the number of requests going from the client to the server object.

To improve overall performance and scalability, in accordance with an embodiment QuestFields limit the number of queries sent to the QuestObjects server for an individual user. As described previously with regard to FIG. 13C, the client software accumulates user input for a certain amount of time. This is managed in two client-side "tiers": the Questlets (the user interface elements inside of the QuestField), and the Questers (the non-visual objects that communicate with the server).

In accordance with an embodiment, data "accumulation" can be controlled by the Quester objects. Questers determine the delay that occurs after receiving a query request and before that query is sent to the server via the communications controller. Whenever a new query request (typically, a character or word typed or pasted into a QuestField by the user) is received by a Quester, any prior queries still being delayed are superseded in favor of the new query. In this manner a Quester can accumulate multiple query requests, triggered by user input, before the final query actually goes to the server. The size of this delay determines query frequency in response to user events, and therefore affects both responsiveness of the user interface and traffic to the server. Depending on the server response speed and the network latency, a Quester can send a new query before receiving a result from a previous one. Questers determine high-load (slow server) situations based on the size of the pending query "queue".

Queries triggered by a dependency from another Questlet are not subject to the same minimum delay. In accordance with an embodiment a dependency query delay is determined by the Quester that triggers it; all dependent Questers send their queries immediately after this delay. If the triggering Quester receives a new query request, then the new query request immediately supersedes any delayed queries being accumulated in dependent Questers.

Longer delays can also be suggested by a Questlet. For some user interface events, a Questlet can suggest a longer-than usual delay (but never a shorter delay than the one calculated by the Quester). A Questlet will typically do this in two situations: (1) when the user hits "backspace"; and (2) when the user types other commands that suggest that the user is still editing the field, such as "cut and paste" and "delete". This indicates that further editing of the query string is likely, so the accumulation period is extended accordingly.

FIG. 23A and FIG. 23B show the various variables 344 involved in calculation of the accumulation delay in accordance with an embodiment. The accumulation delay is calculated by Questers in the following manner. Normally, a default delay (defaultAccumulation) is used, which is determined by average typing speed on the target device (averageTypingSpeed). This delay is shortened when the length of the query string (queryLength) is longer. However, there is always a minimum delay based on the average network latency (averageLatency), with the exception of dependency queries mentioned above.

FIG. 23B shows a flowchart 348 illustrating the process performed by the system to determine the accumulation. If and when there are queries in the queue already, the delay is determined by the number of pending queries (pendingQueryCount) and an estimated query time (queryTime), which is approximately the time it takes between a query request and the receipt of results. This query time can be initially determined from the average network latency (averageLatency) and re-calculated every time results are received. It has an assumed minimum (minimumQueueTime), and can be determined from the time between sending the query and receiving the corresponding results (calculatedTimeTakenByQuery). In addition, the query time cannot decrease from its previous value by more than the default accumulation time (defaultAccumulation). This limitation is imposed to limit the impact of queries that are relatively fast due to cached results.

If the result for the last remaining pending query is received, then any accumulated query can be sent immediately, rather than waiting for the remainder of the delay. If a Questlet suggests a slow query delay (slowQueryDelay), then that will be used assuming it is longer than the minimum.

RESTful Protocol Implementations

In accordance with some embodiments, the communications protocol does not need to transfer user session information to the server with each request coming from the client. Instead of the client first starting a session on the server, and the server keeping that session available to the same client, the server does not maintain a session for each client. This "session-less" relationship between the client and the server is sometimes referred to as a "RESTful" ("Representational state transfer") relationship. Representational state transfer is a style of software architecture that can be used for distributed hypermedia systems such as the World Wide Web, and the Hypertext Transfer Protocol (HTTP) specification.

In accordance with RESTful embodiments, the client object does not pre-register information about how the server object should respond to subsequent requests. Instead, the client system packages each request into a full communication packet that contains all of the necessary information for the server object to do its work. The server object does not remember information it learned in prior communication from the same client, and does not combine the input requests that it received from a client in a prior communication exchanges with the incremental input it receives from the same client object in subsequent communication. In RESTful embodiments, individual requests sent from the client to the server are typically more complex (especially in multi-Quester situations with dependencies). Although one advantage of RESTful embodiments lies in the fact that subsequent requests from the same client may be communicated to (and handled by) different server instances running on different computers (thus increasing scalability), scalability can be negatively affected because the subsequent requests from the same client can likely be handled by the server from its cached data, which will not necessarily be present on other servers. As such, the performance benefits of using a RESTful protocol depend on the use case and on the content.

Although in RESTful implementations there is no such thing as a "session" being exchanged between the client system and the server system these implementations can still recognize a "user session", the information of which is then maintained fully on the client system, wherein each request from the client object communicated to the server object represents the full information needed for the server object to respond.

Full-page QuestFields

In accordance with some embodiments, the system can use third-party technologies to implement the client object and the communications controller object on the client computer to communicate over the network with the server computer, in addition to different low-level communications protocol implementations. In embodiments that package the information requests and responses in XML (Extensible Markup Language) and transmit them over HTTP (HyperText Transfer Protocol), the client object can be implemented using technologies that provide ready-made "XML over HTTP" functionality to the client object on the client computer.

In embodiments that use a browser-based client, the client object can be implemented, for example, in the ActionScript language, which is then compiled to run in an Adobe Flash Player software installed in the user's browser. The Adobe Flash Player provides an XML object that can be called by the client object to send and receive XML-formatted information packets to implement a communications protocol. One advantage of using Adobe Flash over other client technologies is that the Adobe Flash Player software allows the client object to communicate with server objects that are hosted in a different Internet domain (or sub domain) from the web page that contains the client software embedding the client object.

Modern browsers offer an alternate means to asynchronously communicate and exchange information between the browser and the server, implemented as the so-called "XMLHTTPRequest Object" available in the browser and callable through JavaScript in the web page. Applications that implement this technique are typically referred to as "AJAX" applications (Asynchronous JavaScript and XML). Browser-based embodiments that use AJAX to communicate with the server do not need the Adobe Flash Player to communicate with the QuestObjects server: the client object (or just the client object's communications controller component) can be implemented in JavaScript and can use the XMLHTTPRequest method to communicate with the server object.

A disadvantage of AJAX is that, for Internet security reasons, a client object residing in a web page loaded by the user's browser cannot communicate directly with any server object that is hosted on a different domain or sub domain. (Through the use of "browser hacks" such as frames or dynamic addition of <script>tags to the web page, embodiments can get around this limitation. However, this is not considered safe because future browser versions can close such "loopholes". The workarounds often have unacceptable negative performance penalties).

An alternative means to deploy embodiments where the client object is hosted on a different (sub) domain than the server object, is to install a so-called "proxy" on the client object's domain. The client object then communicates with the proxy (on the same domain) that forwards the client's communication packages to the server object. The server's responses are sent to the proxy, and are then forwarded to the client object by the proxy. Proxies like this can easily be configured in popular web servers such as Apache, and forwarding proxy functionality is often also offered by load balancing hardware and software.

Figure 24A:
FIG. 24A and FIG. 24B show screenshots of embodiments of the present invention that allow of the use of varying technologies to communicate asynchronously between the client and the server.
Figure 24B:
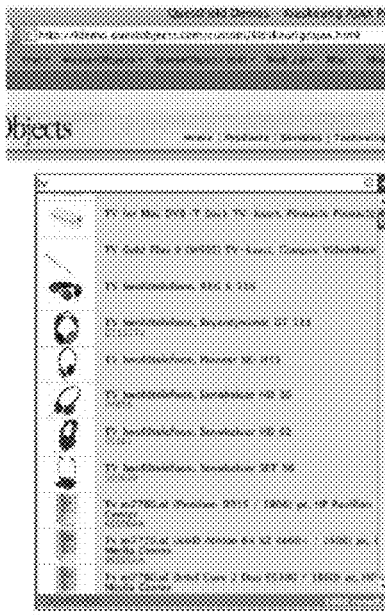

FIG. 24A and FIG. 24B show screen shots 350, 360 of alternate embodiments of the present invention. FIG. 24A shows a "ProductFinder QuestField" embodiment that is embedded onto an ecommerce website. The QuestField uses a hybrid implementation that automatically detects the most suitable technology to be used to communicate with the QuestObjects server. Depending on the user's browser or device, the client object will communicate with the QuestObjects server using either Adobe Flash or AJAX technology. Automatic detection can be performed through a JavaScript function that checks the user's environment and then tells the client software which technology to use. Different embodiments may also support just one client technology. FIG. 24B shows a screenshot of a web page specifically designed to use AJAX rather than Adobe Flash. Other embodiments can use other means to communicate asynchronously between the client computer and the server computer, e.g. through the use of Microsoft Corporation's Silverlight technology.

Although many embodiments are designed to run within a web browser, QuestField clients can also be implemented for dedicated runtime environments that allow users to use them outside of the traditional web browser, or as an integrated part of pre-compiled client-server applications that run on the user's client operating system. For example, Adobe's AIR environment allows the creation of "web applications" that, through an integrated runtime software environment, appear to run as standalone applications in the user's operating system. Similarly, "Dashboard widgets" in Apple's Mac OS and "Sidebar Gadgets" in Microsoft's Windows Vista OS can be used to implement QuestField clients. A QuestField can also be embedded into a toolbar of third-party applications. Background QuestFields can also be used as "plug-ins" to link non-QuestField search and retrieval interfaces (such as Microsoft's Instant Search or Apple's Spotlight) to remote QuestObjects services, so that users of these third-party search and retrieval interfaces will find and return QuestField search results in addition to the other content they index and return.

If no cross-domain communications capabilities (and no proxies) are available to allow asynchronous client-to-server-and-back communication from within a browser or from a mobile device, then some embodiments can open the client part in a new web page opened in a new window or in a frame or iframe in the page, wherein the new window or frame is loaded from the same (sub)domain that hosts the server part, or from a (sub)domain that has a proxy to the server object. Such an embodiment is referred to as a "full page QuestField".

FIG. 25A, FIG. 25B and FIG. 25C show embodiments 370, 372 of the client that can be run on a mobile device that allows XMLHTTP communications (AJAX) with the QuestObjects server embodiment. Full-page QuestFields are of particular benefit on devices with small screens (such as the iPhone). Although the web page shown in FIG. 24B works on an iPhone, the user interface (notably the way in which the result list is dropped down) does not work very well because it is not adjusted to the small size of the client device, and results might therefore appear off-screen, too large, or too small. In accordance with an embodiment of the client, the QuestField of FIG. 24A or FIG. 24B can detect that it is being accessed from such a small mobile device. This detection can occur when the user first puts the cursor into the entry field (or first clicks on a placeholder that is displayed in the same position as the input field to represent the QuestField). As soon as this happens, the full-page QuestField is displayed on the mobile device, as shown in FIG. 25A. The user can immediately start typing to activate the QuestField and to perform a query, as shown in FIG. 25B.

In accordance with an embodiment, a QuestField is configured in the web page that contains it. When used in tandem with such a QuestField-enhanced third-party web page, the full-page QuestField will automatically configure itself to allow the user to access information just as if it were being accessed from the original page (e.g. the ecommerce page of FIG. 24A). The full-page QuestField that opens when an iPhone user clicks on the field will automatically go to the same content channel and have the same other features as the QuestField on the "parent page", which the full-page QuestField may replace if it is opened in the same browser page (in the "_self" target). In a typical web browser, the full-page QuestField can receive its configuration from the "parent window" as arguments that appear after a question mark in the URL of the full-page QuestField. In some implementations, the full-page QuestField will use a reference to the parent page as it is defined by a frame's "window.parent" attribute or a window's "window.opener" attribute.

Although it fills the entire web page, a full-page QuestField can still resize and adjust itself when the user resizes it, or when the user rotates the page, as is possible on the iPhone. This is shown in FIG. 25C, where the user has rotated the phone into "landscape mode" and the QuestField shows results, as well as an "information bubble" that shows the total number of results received from the server. Because the QuestField itself is no longer visible in order to show the user the maximum number of results, the "Q-symbol" that is normally displayed inside the input field (FIG. 13A) is now displayed in the information bubble, and has become a button that the user can press to reveal the QuestField's input element and the keyboard again, to modify the current query or to start a new query. The "X" on the right of the information bubble allows the user to hide the information bubble entirely. In this example, the user can click at the top of the iPhone window to scroll back to the top of the page that has the input element.

A full-page QuestField embodiment can also be used to provide a scaled-back search interface for those browsers or devices that do not allow asynchronous communication (i.e. browsers or devices that do not support Flash, AJAX, or similar technologies to run). When the user of such a device or browser enters a QuestField embodiment that supports this, he or she is presented with a full page QuestField interface (either in the current page, a frame, or in a new window or popup) that provides a form with a simple static search field similar to "standard" search fields that do not offer feedback while typing as they are commonplace on the Internet. Like other static search fields, the user must then press a Submit or Search button to activate the QuestField search. Results are then displayed in a similar manner to the way results are displayed by typical search engines including Google and Yahoo. However, because it takes over the configuration of the QuestField on the parent page that it replaces, a full-page QuestField will use the same list layout that was configured in the parent page, and can also provide standard "Next" and "Previous" buttons that allow users to page through the results returned by the QuestObjects server.

Content Indexing

In accordance with various embodiments, the information used by the system is typically stored in files or databases. Users find their information through custom web applications, database applications, and search engines. Leveraging existing application infrastructures, QuestFields can access the existing "content engines" to allow users to find and retrieve information at high speed. Through Content Access Modules, QuestFields communicate with multiple databases and search engines, and can also read information from files and legacy systems. QuestFields manage the information retrieval process so that information appears faster than in traditional applications, without creating a large burden on the content sources, yet without copying the information before retrieval.

Some currently available databases or search engines are incapable of returning the right information, or are not powerful enough to return sufficiently fast answers to the QuestObjects server; and some content is stored in flat files which cannot be retrieved through a database or search engine. For these situations, QuestObjects server embodiments can include an indexing feature that reads information and indexes it for retrieval by QuestField users. There is no need to change anything in the existing database or files; regardless of how information is stored, with the QuestFields Indexer information can be made available to users through the present invention. The indexer can work in the background as new versions of data are detected so that users enjoy 24/7 uptime. Once indexed, information can be found without accessing the content source or content engine, so that QuestFields can provide answers while users are typing. With the indexer and built-in retrieval engine, QuestField users can even find information from non-indexed sources.

The QuestObjects Indexer is optional for fast content sources that have their own indexes, such as most SQL databases and LDAP directories, but is of more use with non-indexed content sources such as files. The QuestObjects Indexer can run as an integral part of the QuestObjects server, and will automatically index content that it receives from the so-called Generic File Plugin (the Content Access Module that is capable of reading flat files). The QuestObjects Indexer can also run as a stand-alone application, allowing the data to be indexed on a different machine without burdening the QuestObjects server. The QuestObjects Indexer can also work with so-called "crawler" software that tells the indexer which files to index. This is typically used to index information stored on websites, either on the Internet or in intranet environments. The crawler tells the QuestObjects Indexer which files to index. The QuestObjects Indexer can support multiple file types including plain text, HTML, Microsoft Word, Microsoft Excel, Microsoft PowerPoint, PDF, etc.

Figure 26:
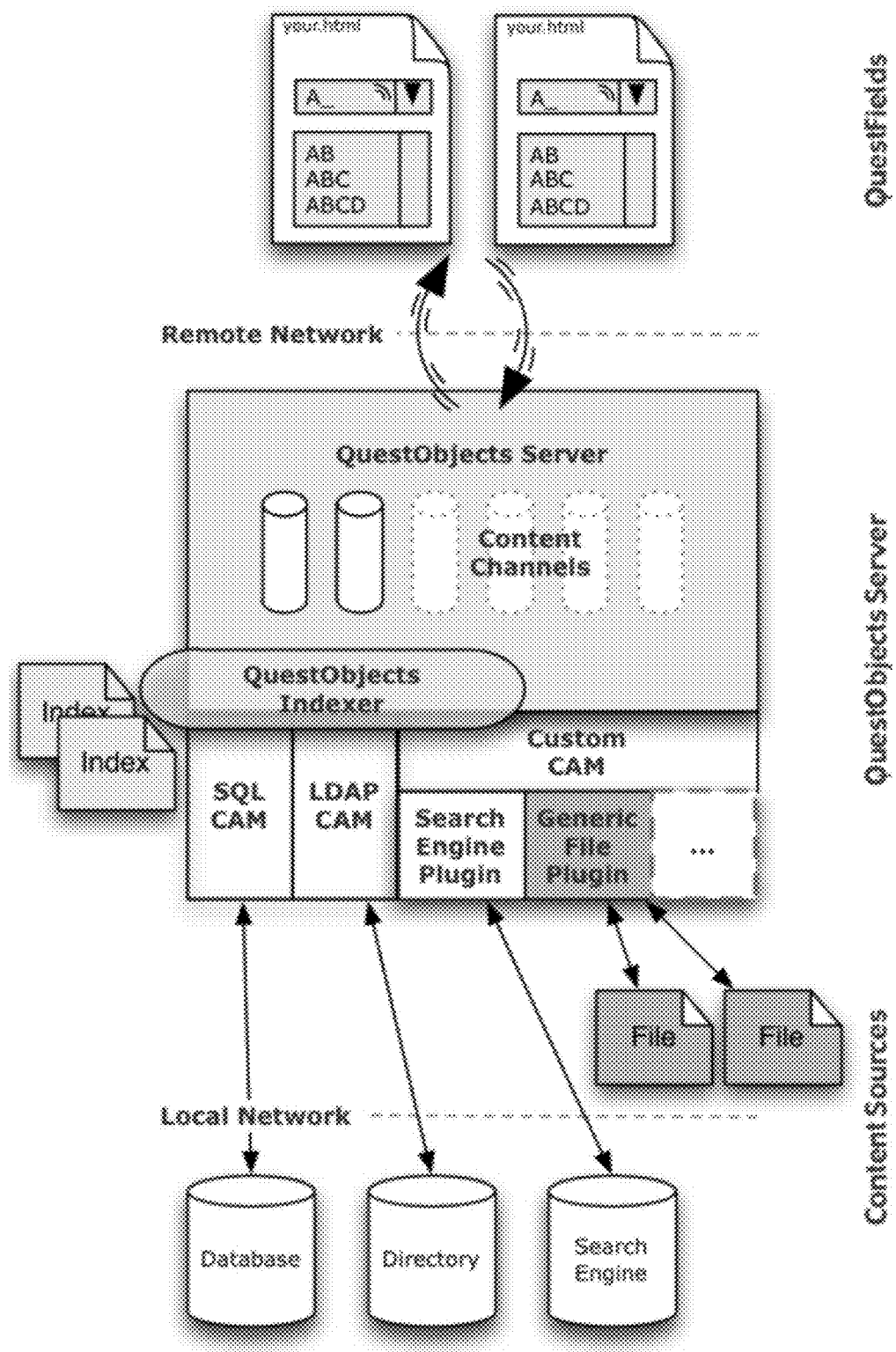
FIG. 26 shows an illustration of a system in accordance with an embodiment, and shows how the QuestObjects Indexer fits into the architecture.

FIG. 26 shows how an embodiment 380 in which the QuestObjects Indexer fits into the QuestObjects server software architecture. As described previously with regard to FIG. 1, the upper component of this drawing depicts the client tier of the embodiment; the bottom of the diagram depicts the various content sources. The QuestObjects Indexer accesses information through the QuestObjects server's Content Access Modules as previously described. The various other parts of the QuestObjects server, as they were described earlier, are depicted in the center of this image. The QuestObjects Indexer can be configured to index information from any CAM that is capable of returning full datasets. The content engine must be able to return all the information that a user wants to search for through a QuestField. Inherently, this is true for information stored in files, but also for information stored in database tables or in directories that can return specified content through a predefined query. For example, using SQL, the entire contents of a table can be read using the statement "SELECT * FROM TABLE".

For faster performance, the QuestObjects server can store the indexes in memory when it starts up, and whenever the QuestObjects Indexer has finished indexing a new data set. However, the indexes can also be stored on disk, and can also be used from disk without reading them entirely into server memory. The QuestObjects Indexer can thus be used to index information from all the content sources depicted at the bottom of FIG. 26 (except the "Search Engine" content source, which usually applies its own indexing and retrieval algorithms). The same is true for most information that is accessible through web services, unless the web service allows all content to be returned to the QuestObjects server at once.

Indexed Retrieval

Once information has been indexed by the QuestObjects Indexer, it can be made available for retrieval by QuestFields through one or more content channels. In accordance with an embodiment, each indexed data set is configured as a "content query", and thus a single content channel can query and combine results from multiple indexes, and combine those with results received from other content sources and corresponding content queries included in the content channel.

In accordance with an embodiment, the QuestObjects Indexer can apply additional algorithms to the text information it indexes in order to improve the recall of information by QuestField users. In some QuestField applications, information is found after the user types one or more characters. The content channel then performs one or more content queries (or retrieval from the indexes created by the QuestObjects Indexer) and returns any information records that contain words that "start with" the characters that the user typed. However, sometimes the characters that the users type to find information are not at the start of a word. Without the QuestObjects Indexer, the QuestObjects server leaves it to the attached content engine(s) to sort out how to best retrieve record based on user input. However, with the QuestObjects Indexer, the QuestObjects server can apply this search intelligence.

Embodiments of the present invention incorporate additional methods to allow users to find information using different search strings than just the start of a word. These embodiments allow this by adding various options that can be configure, including for example camelWords, splitNumbers, minimumSplit, separatorList, stripList, stripZeros, and queryType, as described below. A simplistic approach to increase the recall of information by users would be to do a "mid search" on all the data available to the server, wherein all records are returned that have text that contains the typed characters anywhere in a word. However, with large data sets, this would return way too many results, and would include results that the user did not intend to find. Also, with large data sets, performing a "mid" search is much more processor intensive than retrieving records by matching user input against one or more indexes.

When the "camelCase" attribute is set to true, this attribute causes the QuestObjects server to recognize parts of words that start with an uppercase character after a lowercase character ("Camel Case"). For example, the server will allow users to type "mac" in order to find "iMac" or to type "objects" to find "MasterObjects". The indexer allows this by adding parts of words to the index that start with a capital letter and that are preceded by a lowercase character.

The "splitNumbers" attribute, when set to true, causes the QuestObjects server to recognize numbers and alphanumeric sequences that are part of a longer string, such as a product type. For example, users are able to type "400" in order to find a product containing the text "LG LW-T400A". The "minimumSplit" attribute is used in conjunction with the "splitNumbers" attribute to determine the minimum number of digits or alphanumeric characters that will cause the QuestObjects server to add a word to its index when the string is split using the splitNumbers attribute. If splitting the string results in "words" that are less than minimumSplit, then those words are not included in the retrieval index. So if minimum Split is set to 2, "LG LW-T400A4GT" would not be retrieved by typing just "a", but it would be retrieved by typing "gt".

The "separatorList" is an optional attribute containing a non-separated list of characters that are recognized as word separators, that is, they index the words that follow them: If a dash (-) is included in this list, the QuestObjects server will allow users to type "T40" in order to find "LG LW-T400A", even if a dash is included in the stripList attribute (described below). An example value for this attribute would be: "-/&_".

The "stripList" is an optional attribute containing a non-separated list of characters that are automatically stripped from user queries, and from text in the word index. For example, after including a dash (-) and a slash (/) in the comma-separated list, the QuestObjects server allows users to find "LG LW-T400" by typing "LWT", "LW-T", or "LW/T". An example value for this attribute would be: "-/.\\,".

The "stripZeros" attribute, when set to true, causes the QuestObjects server to create extra words in the index for numbers that have leading zeros. Users are able to find results containing a number without having to type the leading zeros, so a result containing "000123" can be found by typing "123".

The "queryType" attribute has three possible values: 2, 4, or 6. It determines the type of query that is executed against the index. The default value (2) provides a Prefix query. This means that all words are found that start with, or are equal to, the words in the actual query. This can cause a significant amount of temporary memory usage during a query when using a large (200+ MB) index. The second value (4) provides a Boolean query. Only words that are equal to the words in the query will be found. While the amount of temporary memory required is not problematic with this setting, it might not provide all the results that the user expects. The third possible value (6) provides a hybrid approach: The QuestObjects server will first perform a Boolean query. If the number of results is lower than the maximum set for the channel, a Prefix query is done for all words that are 3 characters or longer. If the maximum is still not reached a Prefix query is done for all words of 2 characters and longer, etc. until all words are used in a Prefix query. Using this third setting only makes sense in combination with setting the maxSearchClauses attribute in the Content Access Module configuration. If searches exceed the search clauses limit, a result is appended to the results list to inform the user. For example: "Results limited to exact matches for xx, yy, zz.". Users can then add characters to the words in their query. Because of the possible multiple searches, it takes longer to get a result. However the temporary memory requirement is controllable with the maxSearchClauses attribute and the results are what the user expects.

Syndication QuestFields

In accordance with an embodiment, the client part (referred to as the "QuestField") can be used to retrieve content from QuestObjects servers that are hosted on Internet domains which are different from the web page itself. This enables content owners and providers to offer "Syndication QuestFields" to customers and associates, wherein these customers and associates place a QuestField on their own web site(s) or portal(s) in order to allow their users and visitors to retrieve content from the content provider, as if the content were owned and hosted by the third-party.

Figure 27A:
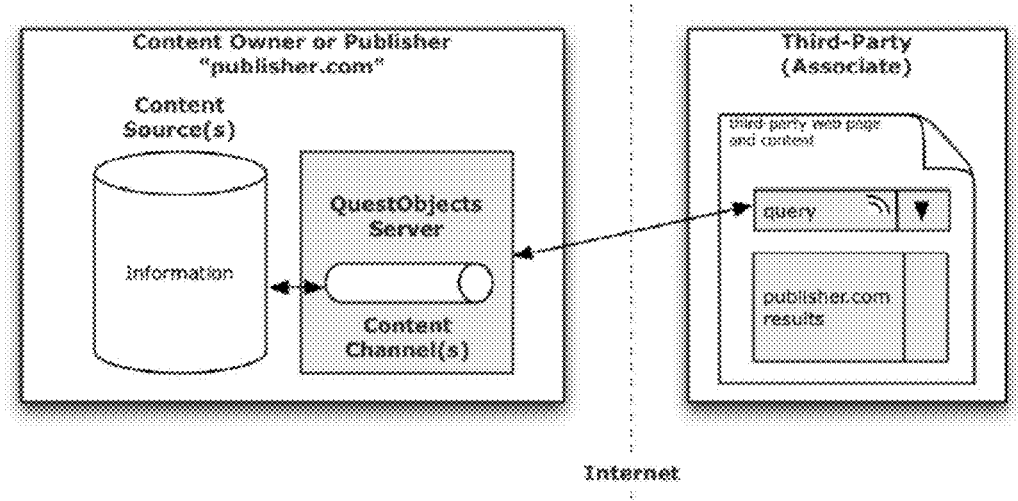
FIG. 27A and FIG. 27B show illustrations of two business cases in which the present invention is used to provide "syndicated" access to content through fields on third-party web sites.
Figure 27B:
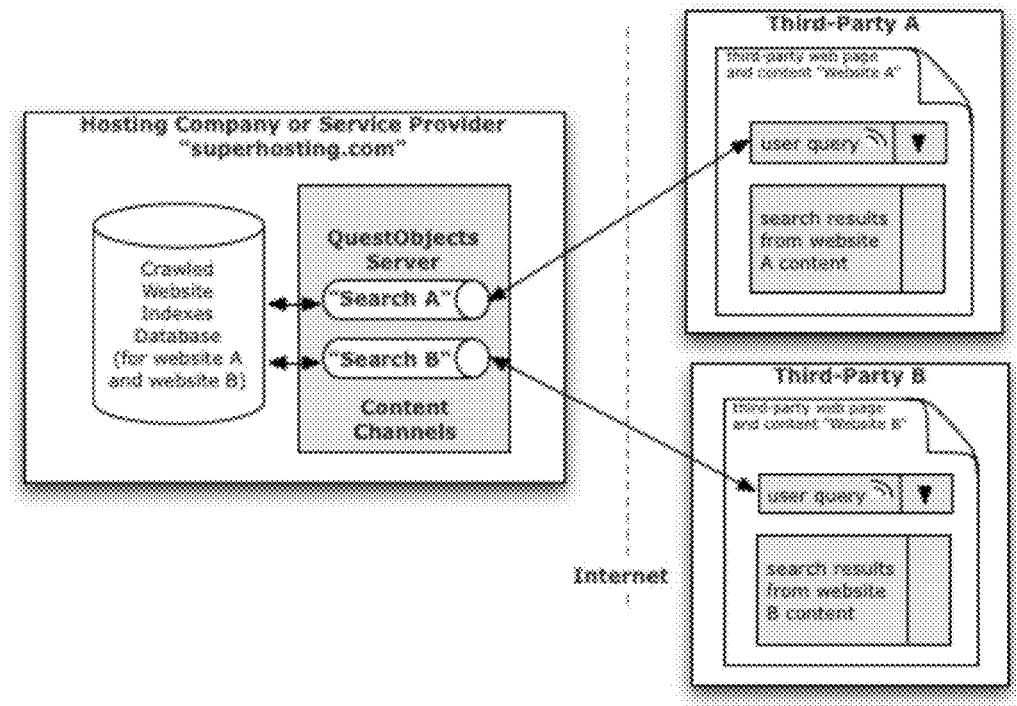

For example, a newspaper publisher that wants to draw visitors to its site or content can allow associates to place a "News Search" QuestField on their websites, which will in turn, access a content channel configured on the QuestObjects server owned by the newspaper publisher. FIGS. 27A-B show how an embodiment 382, 386 of such a system works: a Content Owner or Publisher (who hosts and publishes its information from the hypothetic domain name "publisher. com") has a database of information that is made available through configured content channels in a QuestObjects server hosted on its domain. Third-party "Associates" can subscribe to the information and make it available to users of their own web pages by embedding a QuestField to their page(s), or by providing a button that opens up a full-page QuestField as described earlier.

As another example, an Internet hosting provider can offer a service that automatically indexes the content (including web pages, documents, as well as information published through web services) of customer websites, and then allow its customers to place QuestFields on the web pages on their own sites in order to allow visitors to search their site content. FIG. 27B show how this works. The hosting company or service provider crawls, indexes, or imports third-party content and stores the resulting indexes so they can be accessed through a QuestObjects server owned by the hosting company or service provider. Each "content set" is made available through a content channel ("Search A" and "Search B" in FIG. 27B). The third parties who own the websites and their content can subsequently place a QuestField on their web page(s) so that their users and visitors can find their content through a QuestField. This model works both for "Website Search" functionality as for other types of retrieval, wherein the third parties make the content available to the hosting company. For example, a product catalogue owner (or product seller) can upload the complete database of product records to hosting company or service provider who indexes the products and makes them available through a QuestObjects content channel. The owner of the catalogue can then place a QuestField on its web page(s) to allow visitors to quickly find their products in the QuestFields results list.

The QuestFields system provides significant business values. For example, a third party that wants to make its information searchable/findable does not need to install any software. The content owner only needs to add a bit of QuestField code to its web page(s) in order to make the content easily findable. The hosting company or service provider can charge for its "QuestObjects Service". It is also possible for the provider to generate revenue by inserting advertising in the search results or displaying advertising in the QuestField (hosted by its "customer"). By making their information searchable and findable on third-party websites, content publishers can draw more visitors to their content and increase the value of their brand name. Note that the results that appear in the QuestField (on the third party "associate" websites) can include links to the publisher web site and to specific (potentially valuable or paid) information made available to the publisher. A QuestField can display results that force a user to login to the publisher's website on a paid subscription basis.

As described previously, Syndicated QuestFields do not necessarily need to be part of the third-party web page(s) that are loaded in a web browser. A Syndicated QuestField can also be implemented as a "widget" or "gadget" that users run in a third-party runtime environment such as Adobe AIR, Apple Spotlight, or Microsoft Sidebar. A Syndicated QuestField embodiment can also be provided as a special precompiled application that is installed on the users' native operating system(s).

Some aspects of the present invention may be conveniently implemented using a conventional general purpose or a specialized digital computer, microprocessor, or electronic circuitry programmed according to the teachings of the present disclosure. Appropriate software coding can readily be prepared by skilled programmers and circuit designers based on the teachings of the present disclosure, as will be apparent to those skilled in the art.

In some embodiments, the present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magnetooptical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method, comprising:
    detecting, on a client computer, entry of a content search query into a field on a web page by a user;
    while the user is entering the content search query, automatically sending a string representing an incomplete search query to a server system comprising one or more computers;
    receiving, by the server system, the string;
    matching, by the server system, the string to entries in a cache of query strings and search results based on content queries received from multiple users, whereby cached search results contain a subset of data from one or more content sources;
    retrieving, by the server system, search result data for the incomplete search query;
    sending, by the server system to the client computer prior to completion of the search query at the client, a message containing information identifying the incomplete search query and at least a portion of the search result data that identifies the content in a content source;
    asynchronously receiving, on the client computer, without loading another web page and while the user is entering the content search query into the field, the message, and displaying at least a portion of the search result data on the client computer and enabling the user to retrieve additional content data corresponding to the search result.

2. The method of claim 1 whereby the web page is a screen on a cell phone or a personal organizer and whereby the search result data or content are received and displayed on the client computer while the user is entering the content search query into the field.

3. The method of claim 1 whereby the client displays the portion of the search result data after verifying that the message asynchronously received from the server system matches the then-current incomplete search query by testing a string or a message identifier received as part of the message from the server system.

4. The method of claim 1 whereby the search result data that identifies the content in a content source is a key, logical link, or Universal Resource Identifier, enabling the client computer to retrieve the additional content data corresponding to the search result.

5. The method of claim 1 whereby the search result data contains a language code, a creation date, a modification date, a pronunciation, a meaning, a possible use, a synonym, a reference, a scope note, a notation, a source, a UDC coding, a description, a reference, a link to an image, movie or other multi-media object, a product code, a category, a price, a currency, a stock symbol, a company name, a time stamp, or an instruction to a control system.

6. The method of claim 1, further comprising sending, by the server system to the client computer, a message containing updated search result data in response to asynchronously receiving, from the client computer, a string representing an updated version of the search query.

7. The method of claim 1, wherein the search result data is retrieved by the server system from the cache.

8. The method of claim 1, wherein at least a portion of the search result data is retrieved by the server system from the one or more content sources.

9. The method of claim 8, wherein retrieving search result data comprises:
    sending one or more content inquiries to one or more respective content sources; and
    receiving content data in response to the one or more content inquiries.

10. The method of claim 9, wherein at least a portion of the content data is stored in the cache after receiving it from the one or more respective content sources.

11. The method of claim 1, wherein a content source is a database, a search and retrieval system, a thesaurus, a reference work, an address book, a control system, a dictionary, an encyclopedia, a products database, a quotes library, a stock quote system, a news service, internet advertisements, a catalog, a complex function, a translation engine, a classification scheme, a lookup list, an auto-complete history, an algorithm, a directory, or a search engine.

12. The method of claim 1, whereby the client computer stores at least a portion of the search result data received from the server system in a client-side cache, whereby upon detecting a modification of the content search query or entry of a new content search query, the client computer queries the client-side cache and if matching result data is found, displays at least a portion of the search result data without sending a message to the server system.

* * * * *